(12) United States Patent
Edridge et al.

(10) Patent No.: US 11,783,007 B2
(45) Date of Patent: Oct. 10, 2023

(54) APPARATUS AND METHOD FOR GENERATING A RECORDING

(71) Applicant: Sony Interactive Entertainment Inc., Tokyo (JP)

(72) Inventors: Paul Edridge, London (GB); Sashikanth Reddy Dareddy, London (GB); Marina Villanueva-Barreiro, Acoruña (ES)

(73) Assignee: Sony Interactive Entertainment Inc., Tokyo (JP)

( * ) Notice: Subject to any disclaimer, the term of this patent is extended or adjusted under 35 U.S.C. 154(b) by 137 days.

(21) Appl. No.: 17/034,027

(22) Filed: Sep. 28, 2020

(65) Prior Publication Data

US 2021/0093973 A1   Apr. 1, 2021

(30) Foreign Application Priority Data

Oct. 1, 2019 (GB) ...................................... 1914148

(51) Int. Cl.
    *A63F 13/67*        (2014.01)
    *G06F 18/21*        (2023.01)
    (Continued)

(52) U.S. Cl.
    CPC ............ *G06F 18/21* (2023.01); *A63F 13/213* (2014.09); *A63F 13/215* (2014.09);
    (Continued)

(58) Field of Classification Search
    CPC ..... A63F 13/67; A63F 13/213; G06K 9/6217; G06N 20/00; G10L 25/57
    See application file for complete search history.

(56) References Cited

U.S. PATENT DOCUMENTS 10,372,991 B1    8/2019 Niemasik
10,395,122 B1*   8/2019 Sievert ................... G06V 20/49
(Continued)

FOREIGN PATENT DOCUMENTS

WO    2016107965 A1    7/2016

OTHER PUBLICATIONS

Extended European Search Report for corresponding EP Application No. 20194563.1, 8 pages, dated Feb. 25, 2021.
Combined Search and Examination Report for corresponding GB Application No. GB1914148.0, 8 pages, dated Mar. 30, 2020.
(Continued)

*Primary Examiner* — Justin L Myhr
*Assistant Examiner* — Carl V Larsen
(74) *Attorney, Agent, or Firm* — Matthew B. Dernier, Esq.

(57) ABSTRACT

A data processing apparatus adapted to generate a recording for a content includes: input circuitry configured to obtain image data and corresponding audio data for the content, the image data including a plurality of image frames, a plurality of machine learning models including one or more first machine learning models and one or more second machine learning models, each first machine learning model configured to obtain at least a part of the image data and trained to output respective indicator data for the plurality of image frames, each second machine learning model configured to obtain at least a part of the audio data and trained to output respective indicator data for the plurality of image frames corresponding to the at least part of the audio data, where the respective indicator data associated with an image frame is indicative of an interest score for the image frame, authoring circuitry configured to select one or more groups of image frames from the plurality of image frames in dependence upon respective indicator data associated with the plurality
(Continued)

of image frames, and recording circuitry configured to generate the recording for the content, the recording including one or more of the selected groups of image frames.

13 Claims, 10 Drawing Sheets

(51) Int. Cl.
    *A63F 13/213*     (2014.01)
    *A63F 13/215*     (2014.01)
    *G06N 20/00*     (2019.01)
    *G10L 25/57*     (2013.01)
    *G06V 20/40*     (2022.01)
    *A63F 13/497*     (2014.01)
    *A63F 13/86*     (2014.01)

(52) U.S. Cl.
    CPC ............ *A63F 13/497* (2014.09); *A63F 13/67* (2014.09); *A63F 13/86* (2014.09); *G06N 20/00* (2019.01); *G06V 20/41* (2022.01); *G10L 25/57* (2013.01)

(56) References Cited

U.S. PATENT DOCUMENTS

| | | | |
|---|---|---|---|
| 2002/0093591 A1 | 7/2002 | Gong | |
| 2004/0163527 A1* | 8/2004 | Kawai | G06T 13/205 84/478 |
| 2007/0186163 A1 | 8/2007 | Yeh | |
| 2009/0208181 A1 | 8/2009 | Cottrell | |
| 2014/0328570 A1* | 11/2014 | Cheng | H04N 21/8549 386/241 |
| 2017/0006322 A1* | 1/2017 | Dury | H04N 21/254 |
| 2017/0065889 A1* | 3/2017 | Cheng | A63F 13/497 |
| 2017/0157512 A1* | 6/2017 | Long | A63F 13/497 |
| 2017/0228600 A1* | 8/2017 | Syed | G06V 20/62 |
| 2019/0180109 A1* | 6/2019 | Sinha | H04N 21/4788 |
| 2020/0311433 A1* | 10/2020 | Oz | G06F 16/739 |
| 2020/0406140 A1* | 12/2020 | Sundareson | G11B 27/005 |
| 2021/0034906 A1* | 2/2021 | Van Welzen | G06V 20/635 |
| 2021/0129017 A1* | 5/2021 | White | A63F 13/426 |
| 2022/0395752 A1* | 12/2022 | Kennett | A63F 13/355 |
| 2023/0010938 A1* | 1/2023 | Phillips | G06N 5/04 |

OTHER PUBLICATIONS

Communication Pursuant to Article 94(3) for corresponding EP Application No. 20194563.1, 6 pages, dated Mar. 30, 2022.

\* cited by examiner

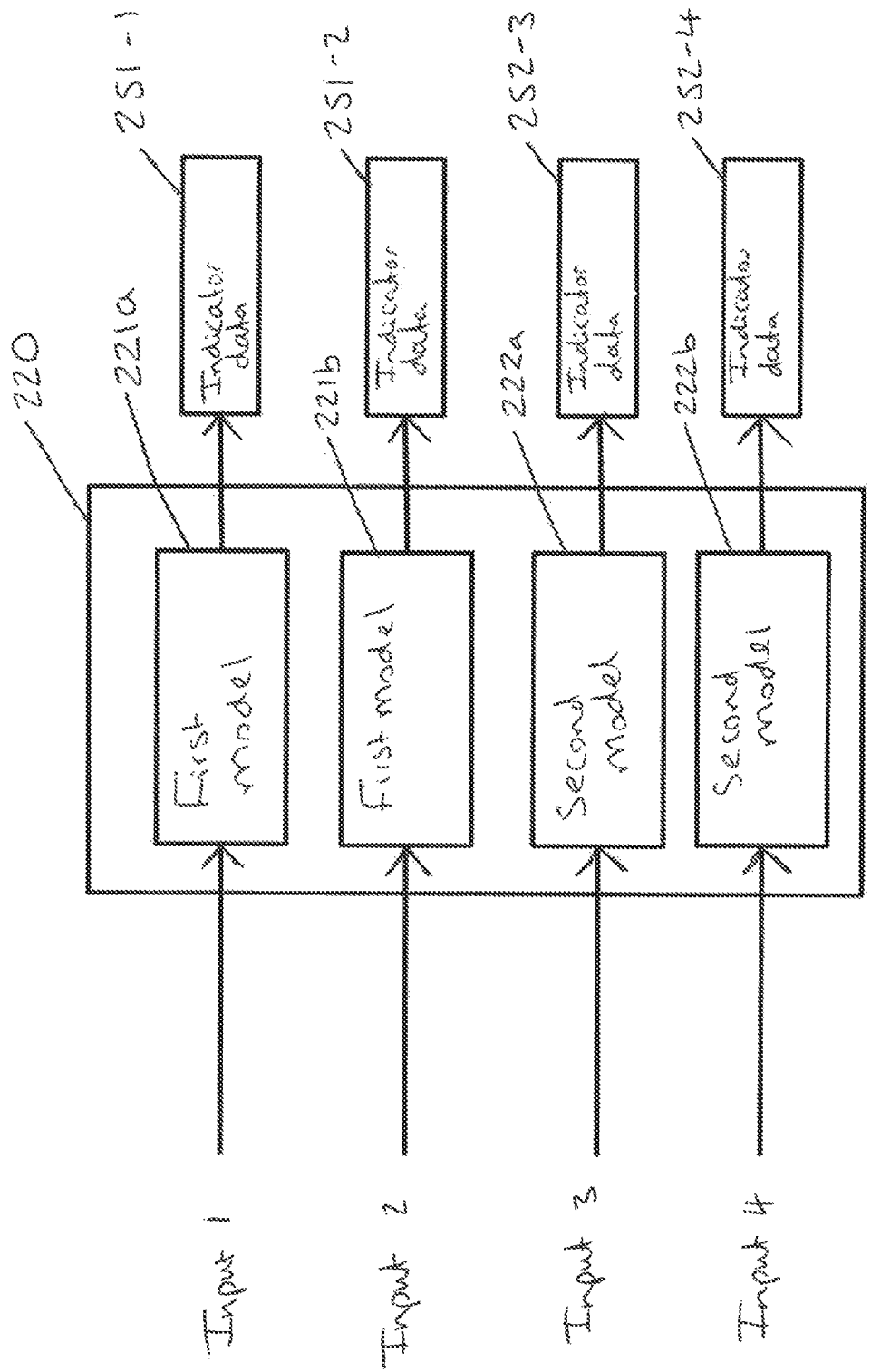

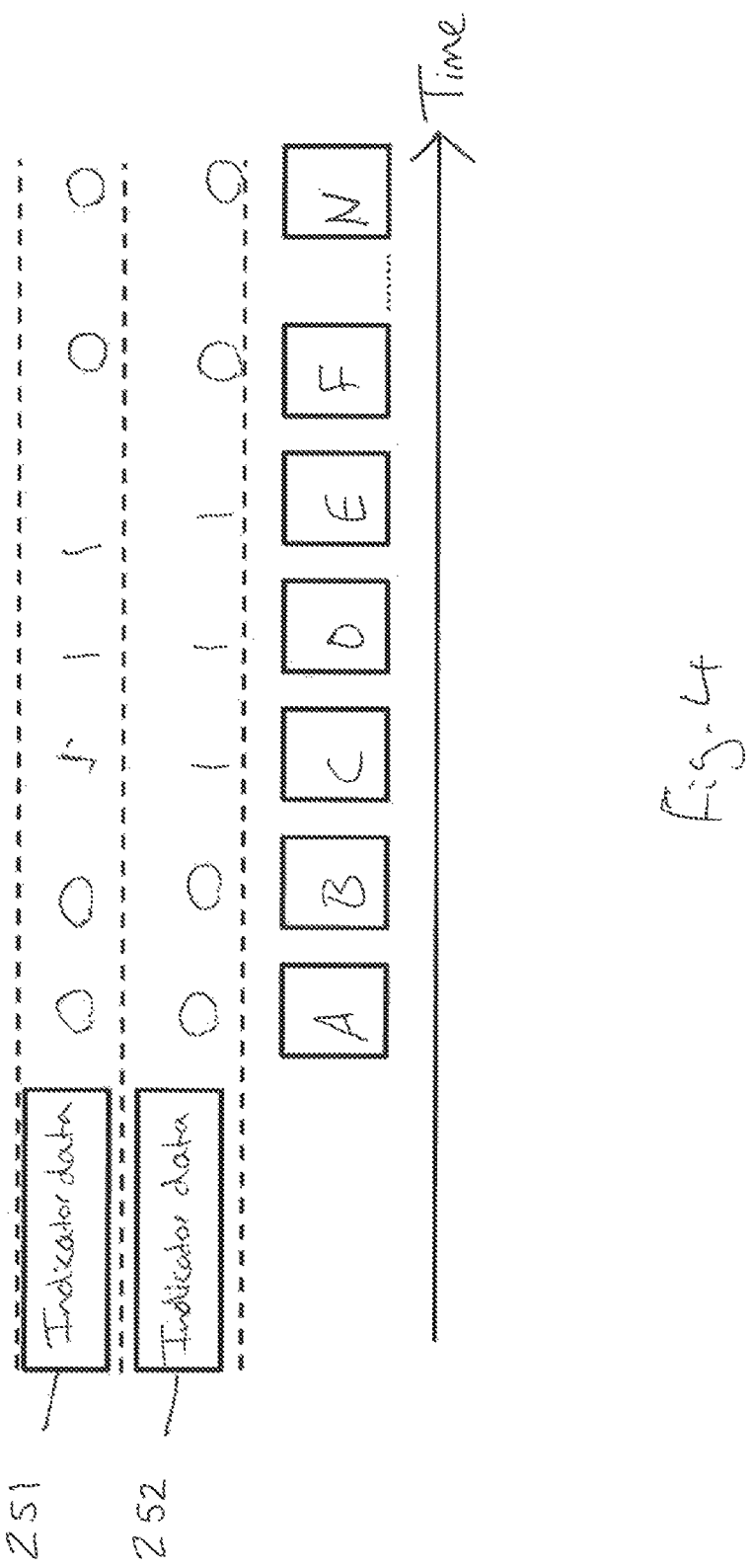

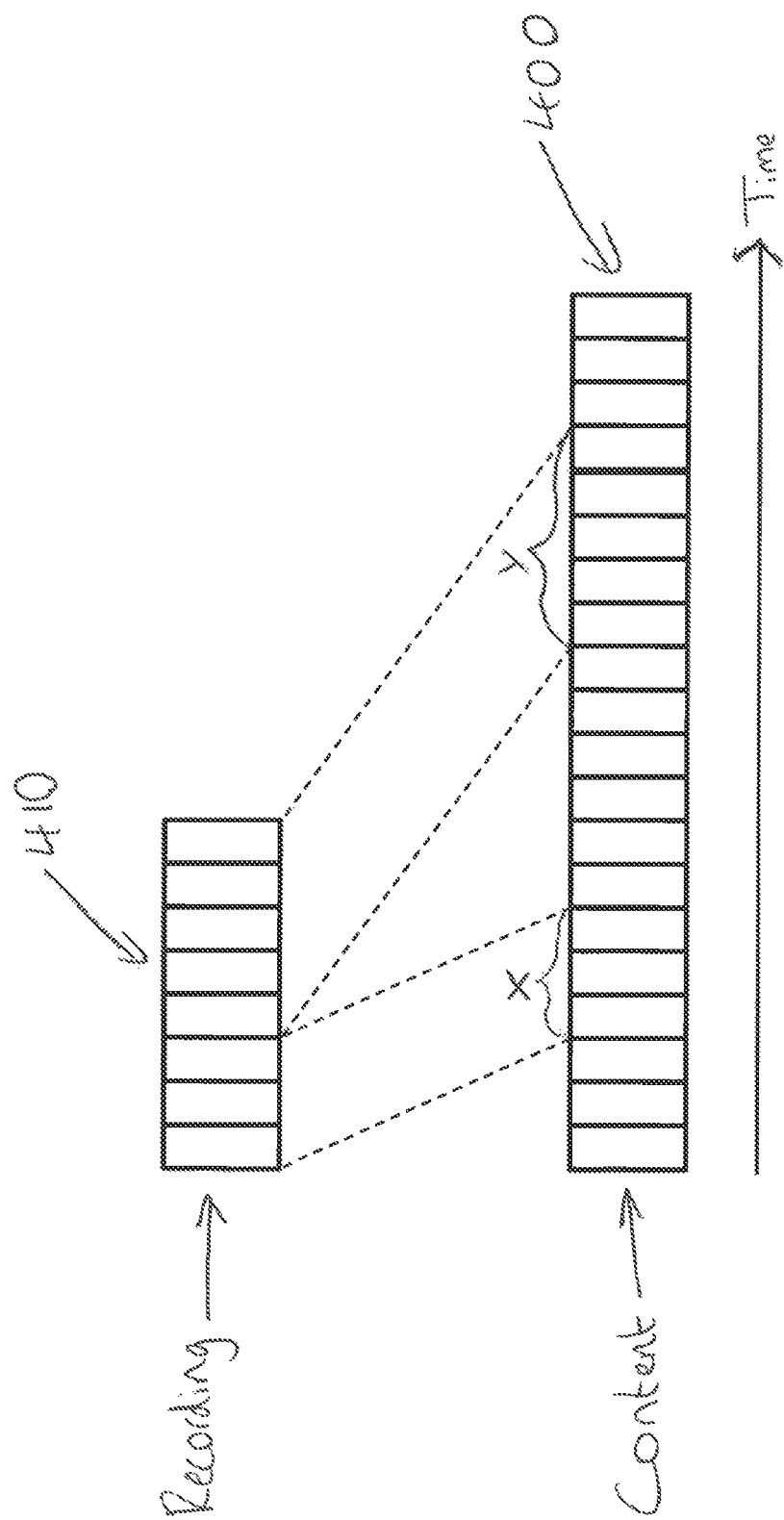

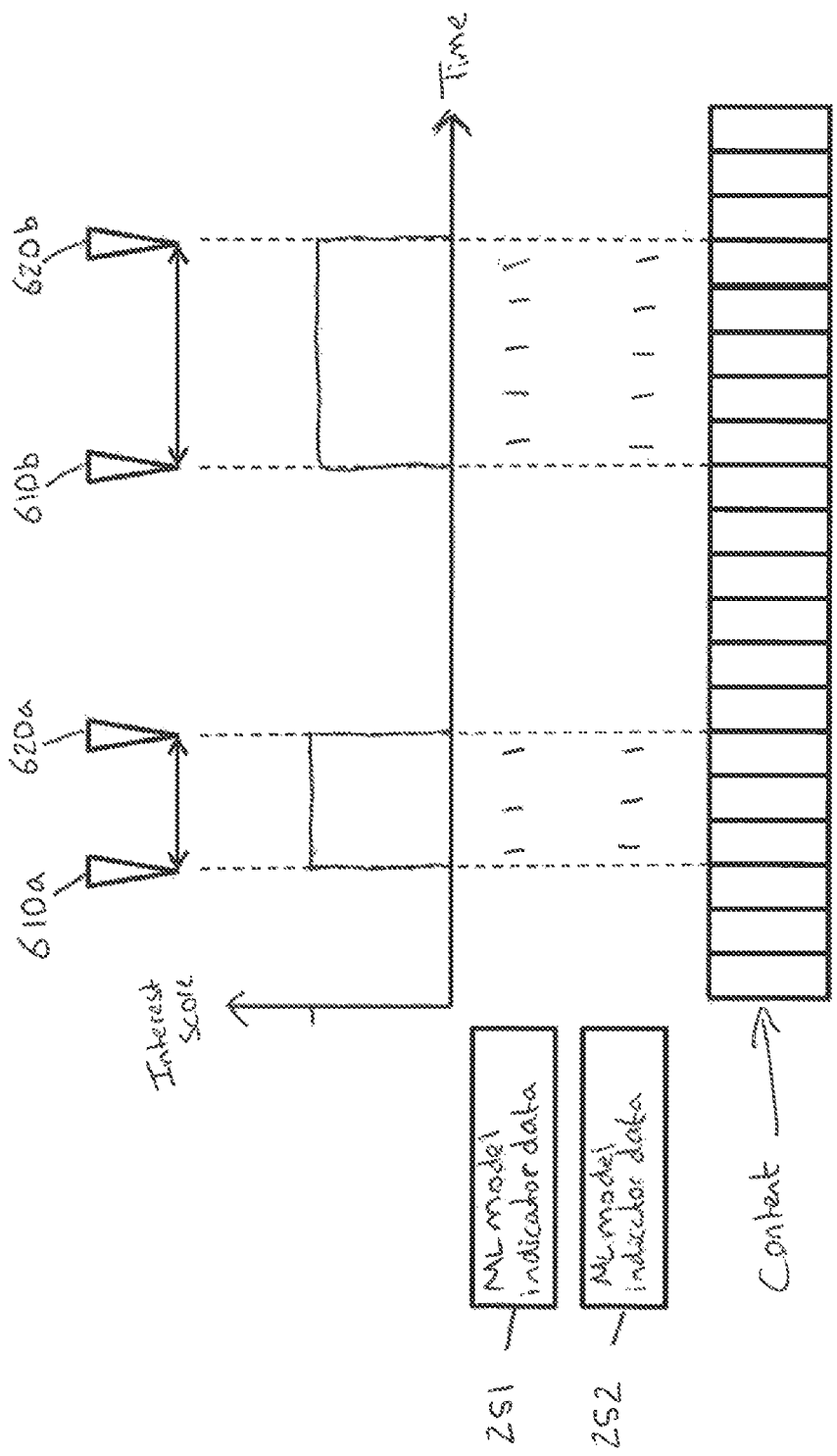

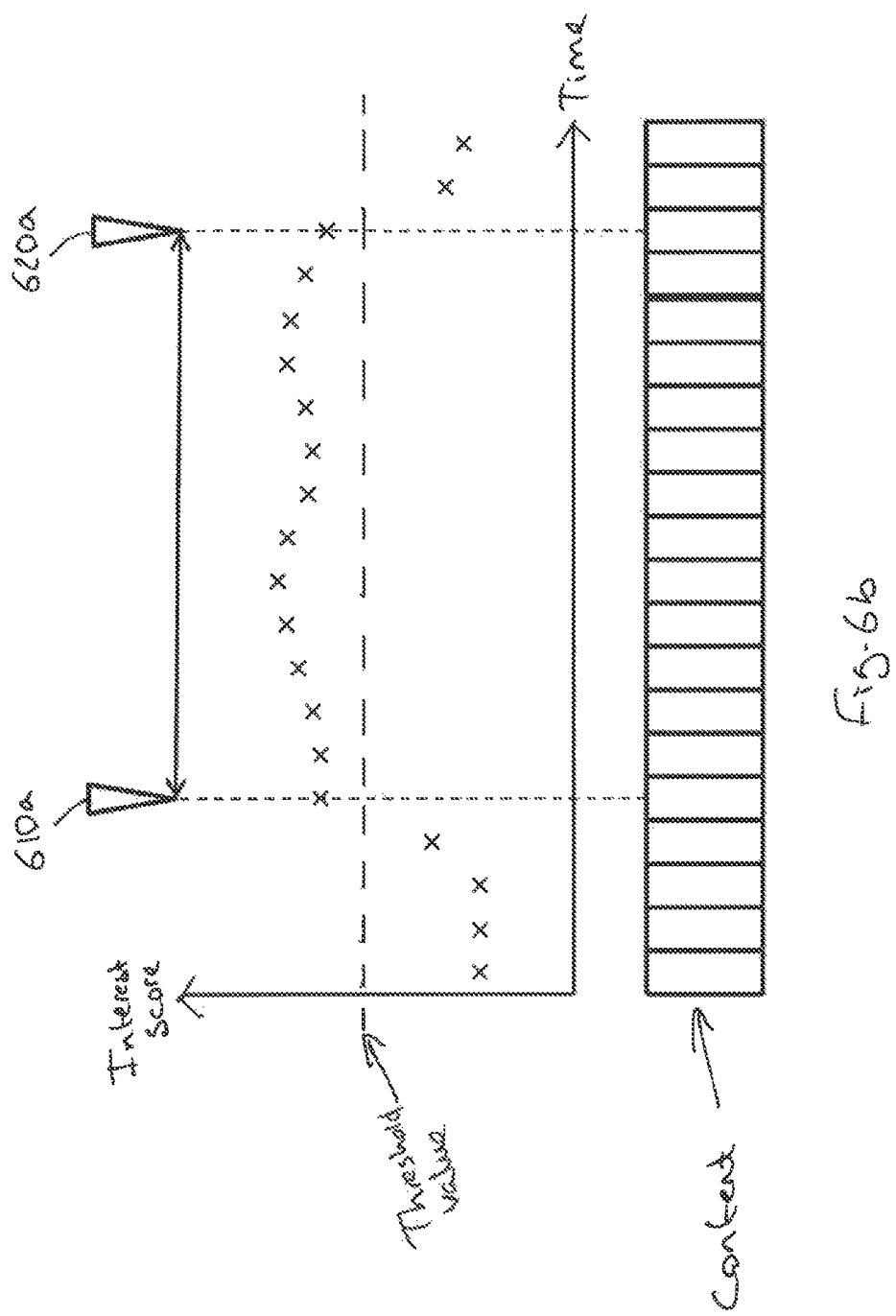

APPARATUS AND METHOD FOR GENERATING A RECORDING

BACKGROUND OF THE INVENTION

Field of the Invention

The present disclosure relates to an apparatus and method for generating a recording for a content. In particular, the present disclosure relates to an apparatus and method for identifying one or more portions of a content on the basis of outputs from respective machine learning models and generating a recording including one or more of the portions of the content.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many different video game consoles allow a player to capture a recording of their gameplay. Typically, this involves continuously recording gameplay over a particular interval and storing the recording in a temporary buffer. The recording may be overwritten with each successive interval, such that only the most recent portion (e.g. fifteen minutes) of gameplay is stored in the temporary buffer. If the player provides an input, such as selecting a 'share button', then a clip that corresponds with the timing of the input is generated and stored in permanent memory.

Capturing recordings in this way relies on a user's ability to anticipate events of interest or importance. Moreover, capturing in-game events in this way often results in a breaking of immersion, where, for example, the user has to interrupt what they were doing in order to interact with the 'share button'.

It is therefore desirable to automatically generate a recording for a content, such as a video game or other interactive content, without a user having to manually select portions of the content for inclusion within the recording.

It is in this context that the present invention arises.

SUMMARY OF THE INVENTION

An example embodiment provides a data processing apparatus adapted to generate a recording for a content, the data processing apparatus comprising:
input circuitry configured to obtain image data and corresponding audio data for the content, the image data comprising a plurality of image frames;
a plurality of machine learning models comprising one or more first machine learning models and one or more second machine learning models, each first machine learning model configured to obtain at least a part of the image data and trained to output respective indicator data for the plurality of image frames, each second machine learning model configured to obtain at least a part of the audio data and trained to output the respective indicator data for the plurality of image frames corresponding to the audio data, wherein the respective indicator data associated with an image frame is indicative of an interest score for the image frame;
authoring circuitry configured to select one or more groups of image frames from the plurality of image frames in dependence upon the respective indicator data associated with the plurality of image frames (optionally in dependence upon the respective indicator data from at least one first machine learning model and at least one second machine learning model); and
recording circuitry configured to generate the recording for the content, the recording comprising one or more of the selected groups of image frames.

Another example embodiment provides a method of generating a recording for a content, the method comprising:
obtaining image data and corresponding audio data for the content, the image data comprising a plurality of image frames;
inputting at least a part of the image data to one or more first machine learning models;
inputting at least a part of the audio data to one or more second machine learning models;
outputting, by each of the first and second machine learning models, respective indicator data for the plurality of image frames, wherein the respective indicator data associated with an image frame is indicative of an interest score for the image frame;
selecting one or more groups of image frames from the plurality of image frames in dependence upon the respective indicator data associated with the plurality of image frames (optionally in dependence upon the respective indicator data from at least one first machine learning model and at least one second machine learning model); and
generating the recording for the content, the recording comprising one or more of the selected groups of image frames.

Example embodiments provide computer software which, when executed by a computer, causes the computer to perform the steps of the method defined above.

Example embodiments provide a machine-readable, non-transitory storage medium which stores such computer software.

Various other aspects and features of the present disclosure are defined in the appended claims and within the text of the accompanying description.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3b is a schematic diagram illustrating first and second machine learning models each outputting respective indicator data;

FIG. 4 is a schematic diagram illustrating an example of respective indicator data output by first and second machine learning models for a plurality of image frames;

FIG. 5 is a schematic diagram illustrating an example of selecting groups of image frames from a plurality of image frames to generate a recording;

FIG. 6a is a schematic diagram illustrating an example of assigning a start tag and an end tag to a plurality of image frames in dependence upon respective indicator data associated with the plurality of image frames;

FIG. 6b is a schematic diagram illustrating another example of assigning a start tag and an end tag to a plurality of image frames in dependence upon respective indicator data associated with the plurality of image frames.

DESCRIPTION OF THE EMBODIMENTS

Figure 1:
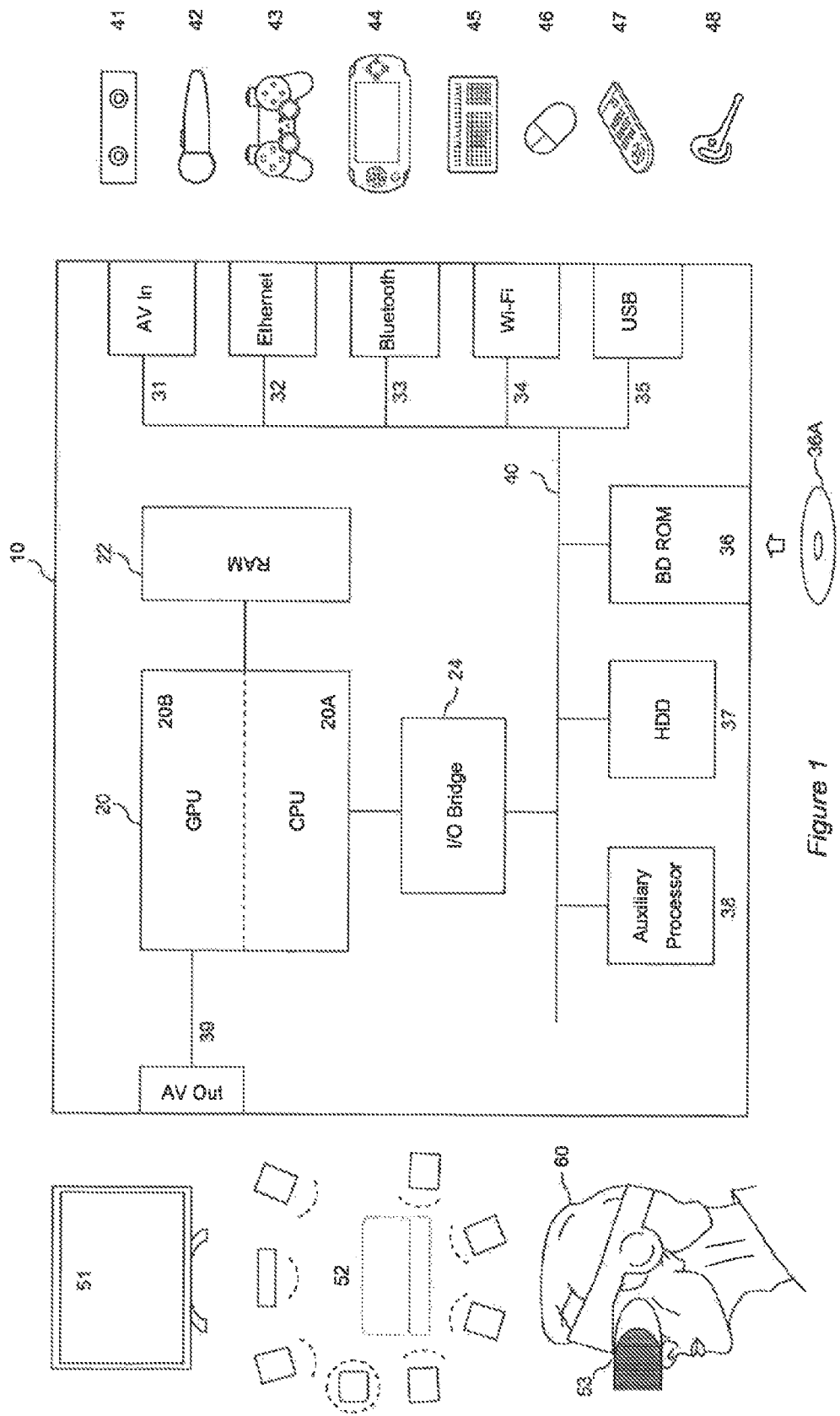
FIG. 1 is a schematic diagram illustrating a computer game processing apparatus.

A more complete appreciation of the disclosure and many of the attendant advantages thereof will be readily obtained as the same becomes better understood by reference to the following detailed description when considered in connection with the accompanying drawings, wherein like reference numerals designate identical or corresponding parts throughout the several views:

FIG. 1 schematically illustrates the overall system architecture of a computer game processing apparatus such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of a computer game processing apparatus configured to execute an executable program associated with a video game and generate image data and corresponding audio data, the image data comprising a sequence of image frames for output in accordance with an execution state of the video game.

When playing a video game using a device such as that shown in FIG. 1, a player may wish to capture moments of their gameplay, where for example, a player is performing a particularly impressive feat within the video game. This may correspond to e.g. defeating a particular enemy or multiple enemies, performing a complex fight sequence, making a difficult jump, etc. Videos including such feats are popular on video sharing platforms such as e.g. YouTube™. In some cases, a player may simply want a memento of their game playing session(s).

As mentioned previously, capturing interesting or important portions of a video game typically requires a user to interact with e.g. a 'share button' whilst playing the video game. In some cases, this means that only those moments that a player remembers to capture manually, are saved. For example, the recording of the video game may be cyclically overwritten, such that only the last 15 minutes of gameplay are stored in a temporary buffer. In some cases, the recording in the temporary buffer may be sufficiently long to have caught the event of interest/importance, but it may be somewhat cumbersome for the player to go back into the recording, and splice the event of interest/importance from the rest of the recording.

Figure 2A:
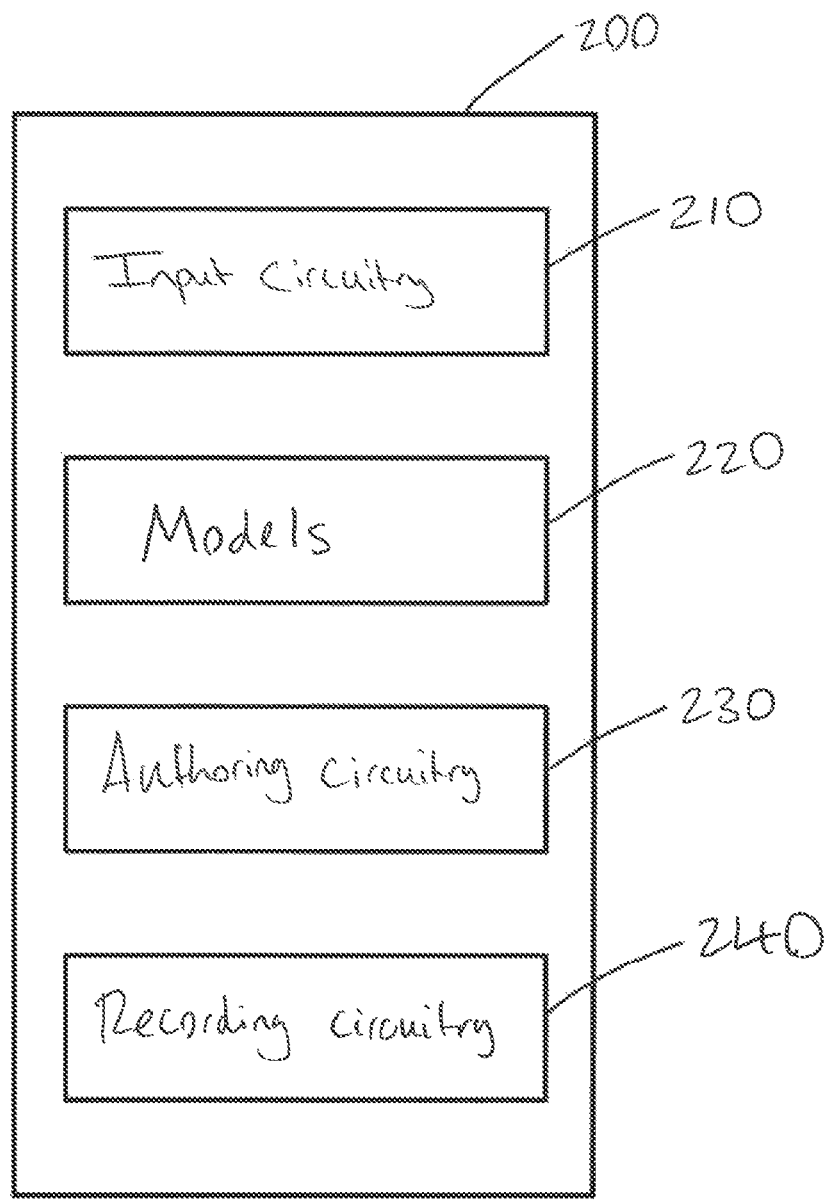
FIG. 2a is a schematic diagram illustrating a data processing apparatus adapted to generate a recording for a content.

FIG. 2a schematically illustrates a data processing apparatus 200 for generating a recording for a content by identifying interesting portions (important portions) of the content and selecting one or more interesting portions (important portions) of the content for generating the recording. In embodiments of the disclosure, the data processing apparatus 200 adapted to generate the recording for the content comprises: input circuitry 210 configured to obtain image data and corresponding audio data for the content, the image data comprising a plurality of image frames; a plurality of machine learning models 220 comprising one or more first machine learning models and one or more second machine learning models, each first machine learning model configured to obtain at least a part of the image data and trained to output respective indicator data for the plurality of image frames, each second machine learning model configured to obtain at least a part of the audio data and trained to output the respective indicator data for the plurality of image frames corresponding to the audio data, wherein the respective indicator data associated with an image frame is indicative of an interest score for the image frame; authoring circuitry 230 configured to select one or more groups of image frames from the plurality of image frames in dependence upon the respective indicator data associated with the plurality of image frames; and recording circuitry 240 configured to generate the recording for the content, the recording comprising one or more of the selected groups of image frames.

Figure 2B:
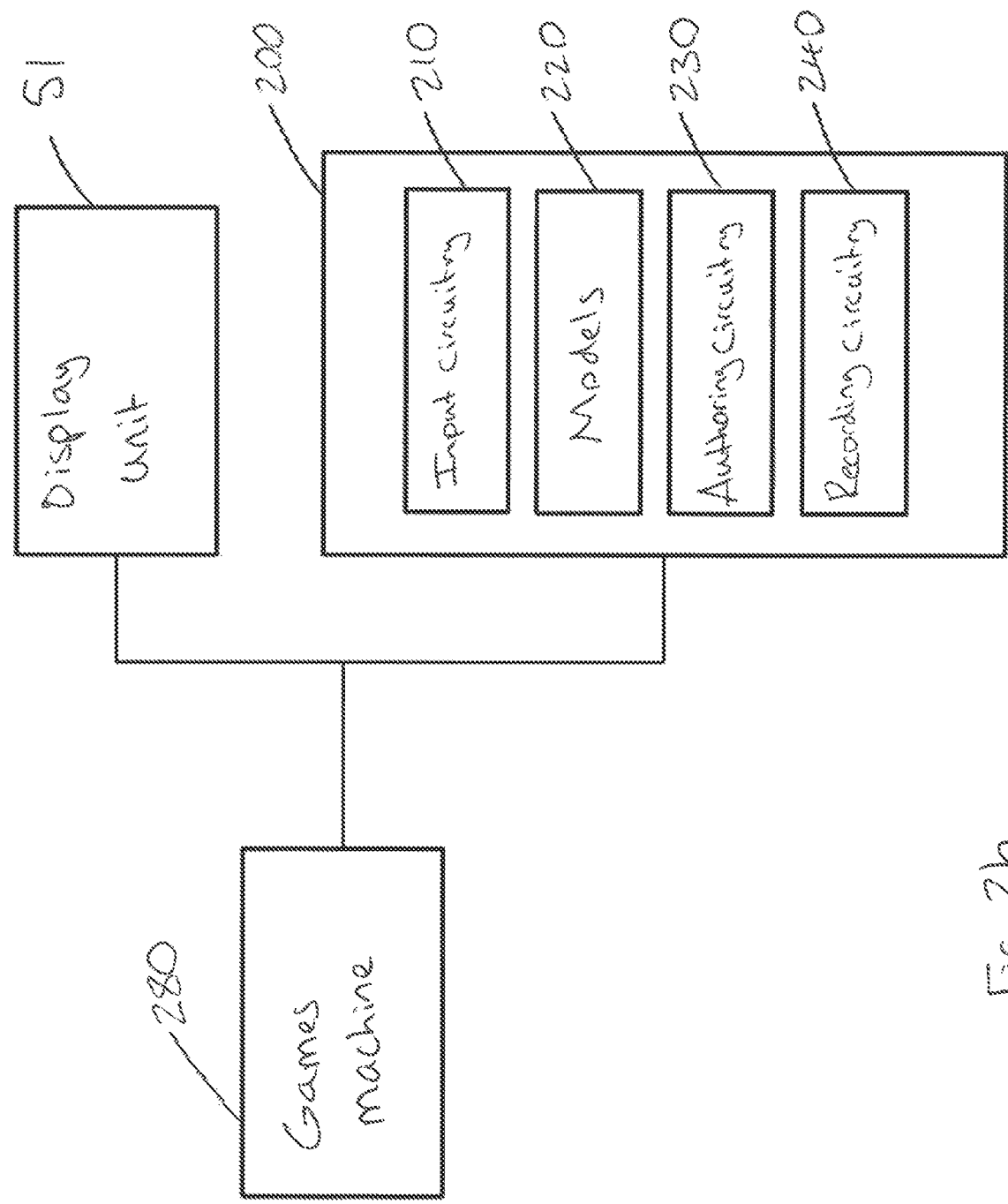
FIG. 2b is a schematic diagram illustrating a data processing apparatus adapted to obtain image data and corresponding audio data from a games machine.

Referring now to FIG. 2b, a games machine 280 is configured to execute an executable program associated with a video game and generate image data and audio data for the video game. The computer game processing apparatus illustrated in FIG. 1 provides an example configuration of the games machine 280. The games machine 280 outputs the image and audio data to a display unit 51 via a wired or wireless communication link (such as WiFi® or Bluetooth® link) so that video images of a user's gameplay can be displayed. The image data and audio data output by the games machine 280 can be obtained by the data processing apparatus 200.

In some examples, the data processing apparatus 200 is provided as part of the games machine 280 which executes the executable program associated with the video game. Alternatively, one or both of the games machine 280 and the data processing apparatus 200 may be provided as part of a remote server (e.g. a games server).

In embodiments of the disclosure, the input circuitry 210 is configured to obtain image data and corresponding audio data for the content, the image data comprising a plurality of image frames. The input circuitry 210 may receive the image data and the audio data from the game machines 280 such that image data and audio data are received during execution of the video game by the game machine 280. In this way, the input circuitry 210 can acquire the data from the games machine 280 concurrent with the display of the video game on the display unit 51, so that a recording of the video game can be generated by the recording circuitry 240 of the data processing apparatus 200 during the playing of the video game by a user. Alternatively, image data and audio data may be stored by the games machine 280 and communicated to the data processing apparatus 200 after completion of the video game, or the data processing apparatus 200 may obtain the image data and audio data and store the data using storage circuitry (not shown in FIGS. 2a and 2b) so that a recording for the content can be generated at a later time by performing the techniques described below.

Video game data comprising image data and corresponding audio data is received by the input circuitry 210 via a wired (e.g. HDMI or Ethernet) or wireless communication link (e.g. WiFi® or Bluetooth® link). Alternatively, where the system is local to or operating on a client playing a game, or a server streaming a game, then the input circuitry may receive the most recently rendered frame directly from a render buffer and/or audio buffer or via an internal data link or a LAN, as appropriate. The image data includes a plurality of image frames arranged in a sequence to provide a visual representation of the content. The image frames may be RGB image frames or YUV image frames. The image data received by the input circuitry 210 comprises a plurality of image frames for which the frame rate is variable (VFR) or fixed for the content. For the case where the frame rate varies over time, the recording generated for the content will also have a variable frame that corresponds to the frame rate of the image data received by the input circuitry 210. Similarly, for the case where the frame rate is fixed (does not vary over time), the recording generated for the content will also have a fixed frame that corresponds to the frame rate of the image data received by the input circuitry 210.

The audio data may include a plurality of audio frames output in synchronisation with the plurality of images frames. However, the audio data may not be divided into audio frames and may instead be provided as an audio track that is synchronised with the plurality of images frames. For example, the audio data my comprise timestamp data for synchronising the audio data with the plurality of image frames. In some examples, the audio signal may not be divided into audio frames and there may be a step of dividing the audio signal into a plurality of audio frames which is performed by the data processing apparatus 200. In one example, the audio signal may be divided in 960 ms intervals, such that each audio frame is 960 ms in duration. For example, the audio may be output at a frequency of 44 kHz, down-sampled to 16 kHz, and then divided into frames such that each frame includes 15,360 samples.

Figure 3A:
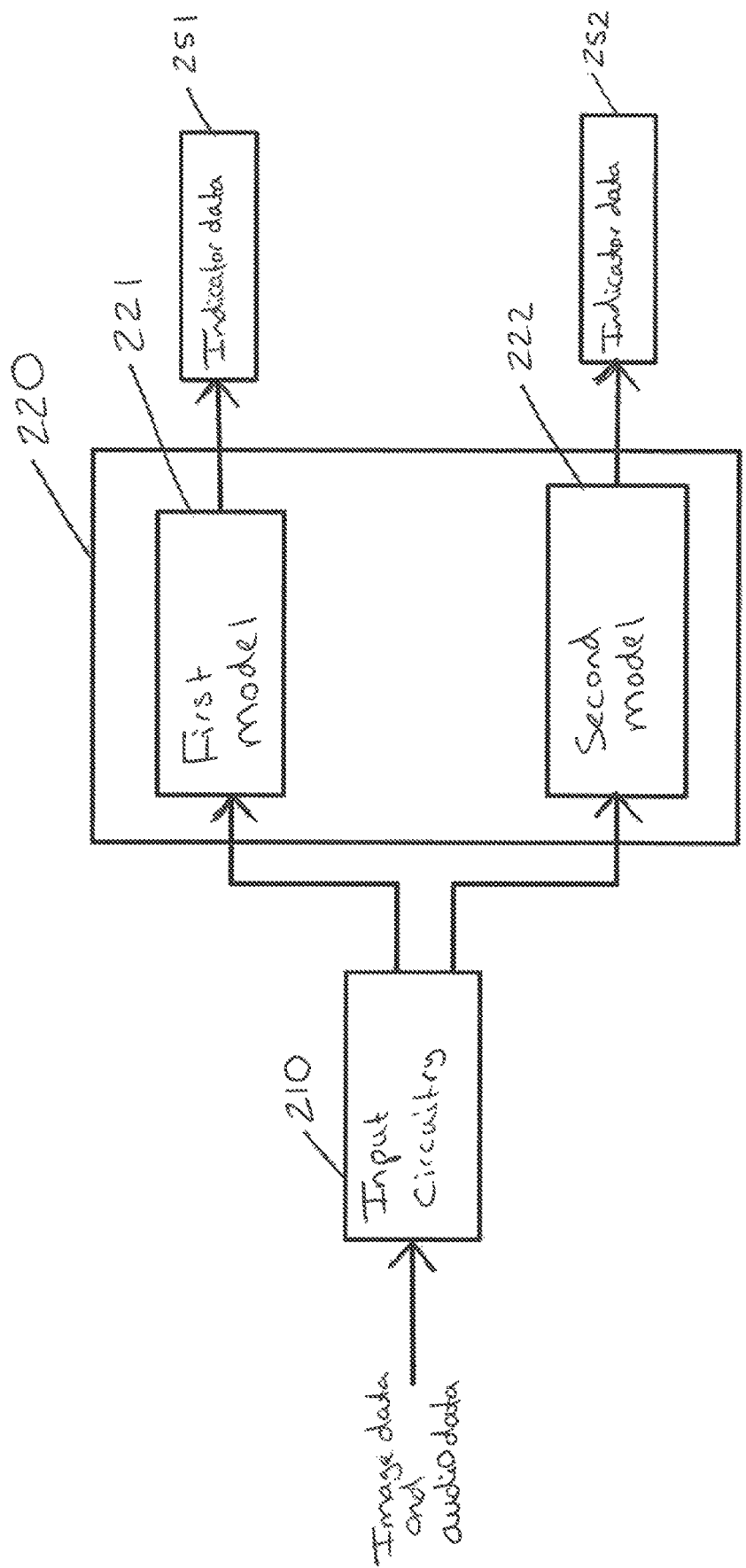
FIG. 3a is a schematic diagram illustrating a first machine learning model and a second machine learning model each outputting respective indicator data.

Referring now to FIG. 3a, in embodiments of the disclosure, the plurality of machine learning models 220 comprises one or more first machine learning models 221 and one or more second machine learning models 222, each first machine learning model 221 is configured to obtain at least a part of the image data and trained to output the respective indicator data 251 for the plurality of image frames, each second machine learning model 222 is configured to obtain at least a part of the audio data and trained to output the respective indicator data 252 for the plurality of image frames corresponding to the audio data, wherein the respective indicator data associated with an image frame is indicative of an interest score (importance score) for the image frame. The image data received by the input circuitry 210 (or at least a part thereof as noted above) is input to each of the one or more first machine learning models 221 and each first machine learning model 221 is trained to output a respective instance of indicator data 251 based on a respective property of the image data. Each first machine learning model 221 is trained for a given property of the image data, and each first machine learning model 221 is trained to output respective indicator data 251 on the basis of the given property for the image data received by the input circuitry 210. The respective properties of the image data for which the respective first machine learning models 221 are trained will be discussed in more detail later.

In some examples, the plurality of machine learning models 220 may comprise a set of first machine learning models 221, in which one of the first machine learning models 221 is configured to output respective indicator data in dependence upon a first property for the image data and another of the first machine learning models 221 is configured to output respective indicator data in dependence upon a second property for the image data, the first property being different to the second property.

In some examples, the image data received by the input circuitry 210 is provided as an input to each of the one or more first machine learning models 221 so that each first machine learning model 221 receives the same image data. In this way, the same image data is provided as an input to each first machine learning model and each first machine learning model is configured to extract, from the image data (image signal), the property for which the first machine learning model has been trained and to output indicator data on the basis of the extracted property. Alternatively, in some examples the image data (or at least part thereof) received by the input circuitry 210 is processed by the input circuitry 210 or other processing circuitry (not shown in FIG. 3a) before being provided as an input to the respective first machine learning models 221, so that the image data can be pre-processed to extract one or more properties from the image data on the basis of the one or more properties for which the one or more first machine learning models 221 have been trained. In this way, the image data is pre-processed to provide processed image data indicative of the first property of the image data as an input to one of the first machine learning models 221 and to provide processed image data indicative of the second property of the image data to another of the first machine learning models 221. Again alternatively or in addition, separately or as part of other pre-processing, at least part of the image data received by the input circuitry 210 is provided as an input to each of the one or more first machine learning models 221 so that two or more first machine learning models 221 receive different image data. Examples of 'parts' of the image data include low-pass filtered and/or high-pass filtered images, with a predetermined threshold passing frequency, and/or low luminance and/or high luminance components of an image, with a predetermined luminance threshold, and/or a fovea and/or non-fovea regions of the image (whether actively tracked, or assumed to be central), and/or an object-of-interest region (for example centred on a player avatar). Other examples will be apparent to the skilled person, and may very depending on the nature of the game or a part thereof.

In a similar fashion to the techniques discussed above for the image data, the audio data received by the input circuitry 210 is input to each of the one or more second machine learning models 222 and each second machine learning model 222 is trained to output a respective instance of the indicator data 252 based on a respective property of the audio data. Each second machine learning model 222 is trained for a given property of the audio data, and each second machine learning model 222 is trained to output the respective indicator data 252 on the basis of the given property for the audio data received by the input circuitry 210. The respective properties of the audio data for which the respective second machine learning models are trained will be discussed in more detail later.

For example, the plurality of machine learning models 220 may comprise a set of second machine learning models 222, in which one of the second machine learning models 222 is configured to output the respective indicator data in dependence upon a first property for the audio data and another of the second machine learning models 222 is configured to output the respective indicator data in dependence upon a second property for the audio data, the first property being different to the second property.

In some examples, the audio data received by the input circuitry 210 is provided as an input to each of the one or more second machine learning models 222 so that each second machine learning model 222 receives the same audio data. In this way, the same audio data is provided as an input to each second machine learning model 222 and each second machine learning model 222 is configured to extract, from the audio data (audio signal), the property for which the second machine learning model 222 has been trained and to output indicator data on the basis of the extracted property. Alternatively, in some examples the audio data received by the input circuitry 210 is processed by the input circuitry 210 or other processing circuitry (not shown in FIG. 3a) before being provided as an input to the respective second machine learning models 222, so that the audio data can be pre-processed to extract one or more properties from the audio data on the basis of the one or more properties for which the one or more second machine learning models 222 have been trained. In this way, the audio data is pre-processed to provide processed audio data indicative of the first property of the audio data as an input to one of the second machine learning models 222 and to provide processed audio data indicative of the second property of the audio data to another of the second machine learning models 222. Again alternatively or in addition, separately or as part of other pre-processing, at least part of the audio data received by the input circuitry 210 is provided as an input to each of the one or more second machine learning models 222 so that two or more second machine learning models 222 receive different audio data. For example, where multiple audio channels are provided, sub-sets may be provided to different models—for example a sub-woofer track may be provided to one model whilst the centre left and right tracks are provided to a different model. Similarly, audio may be split by frequency (optionally with suitable crossover fading) to isolate vocalised speech, or a low-pass or high pass component, wish suitable predetermined thresholds.

Referring now to the example in FIG. 3b, each of the plurality of machine learning models 220 is configured to receive an input and each of the plurality of machine learning models 220 is configured to output respective indicator data on the basis of the input, wherein for a first machine learning model 221 the indicator data is output on the basis of an image-based property for the content and for second a machine learning model 222 the indicator data is output on the basis of an audio-based property for the content. As shown in FIG. 3b, a first machine learning model 221a is configured to receive input data ("Input 1") and to output the respective indicator data 251-1, another first machine learning model 221b is configured to receive second input data ("Input 2") and to output the respective indicator data 251-2, a second machine learning model 222a is configured to receive input data ("Input 3") and to output the respective indicator data 252-3, and another second machine learning model 222b is configured to receive input data ("Input 4") and to output the respective indicator data 252-4.

The input provided to the first machine learning models 221a and 221b may be video data comprising image data and corresponding audio data. Alternatively, the input provided to the first machine learning models 221a and 221b may be just audio data. Similarly, the input provided to the second machine learning models 222a and 222b may be video data comprising image data and corresponding audio data. Alternatively, the input provided to the first machine learning models 221a and 221b may be just image data, the video data having been processed to generate respective image and audio signals.

As discussed previously, the input ("Input 1") provided to the first machine learning model 221a and the input ("Input 2") provided to the other first machine learning model 221b may be the same image data, or may be partially or wholly different. The image data received by the input circuitry 210 may be processed to extract a first property from the image data and the data for the first property is provided as an input ("Input 1") to the model 221a so that the model 221a receives a portion of the image data received by the input circuitry 210. In this way, "Input 1" may be data for a first image property and "Input 2" may be data for a second image property. Similarly, the input ("Input 3") provided to the second machine learning model 222a and the input ("Input 4") provided to the other second machine learning model 222b may be the same audio data, or may be partially or wholly different. The audio data received by the input circuitry 210 may be processed to extract a first property from the audio data and the data for the first property is provided as an input ("Input 3") to the second machine learning model 222a so that the second machine learning model 222a receives a portion of the audio data received by the input circuitry 210. In this way, "Input 3" may be data for a first audio property and "Input 4" may be data for a second audio property.

Each of the plurality of machine learning models 220 is configured to output respective the indicator data 251-1, 251-2, 252-3, 252-4 for the plurality of image frames. The indicator data 251-1 provides an indication of an interest score on the basis of a first image property for which the model 221a is trained. The indicator data 251-2 provides an indication of an interest score on the basis of a second image property for which the model 221b is trained. The indicator data 252-3 provides an indication of an interest score on the basis of a first audio property for which the model 222a is trained. The indicator data 252-4 provides an indication of an interest score on the basis of a second audio property for which the model 222b is trained.

Each of the plurality of machine learning models 220 may output the respective indicator data to provide an indication of an interest score for at least some of the image frames of the plurality of image frames. When the data processing apparatus 200 comprises N respective machine learning models 220, each machine learning model 220 generates respective indicator data such that there are N respective instances of indicator data for the plurality of images frames, where each instance of indicator data is indicative of an interest score one or more image frames (e.g. an interest score may be generated per-frame, or for multiple frames, up to the plurality of input frames).

For image data comprising M image frames, each of the models 220 (e.g. one first machine learning model 221a and one second machine learning model 222a) may output respective indicator data for each of the M image frames to provide a respective indication of an interest score for each of the M image frames. For example, each of the models 220 may output respective indicator data for each image frame in the plurality of image frames and the respective indicator data can be associated with each image frame. The output of a machine learning model may comprise an image frame ID and indicator data associated with each image frame ID. Alternatively, each of the models 220 may output respective indicator data only for an image frame for which the indicator data is indicative of an interest score that satisfies a predetermined threshold condition. This will be discussed in more detail later.

In embodiments of the disclosure, the authoring circuitry 230 is configured to select one or more groups of image frames from the plurality of image frames in dependence upon the respective indicator data associated with the plurality of image frames. Each of the plurality of machine learning models 220 is configured to generate the respective indicator data for the plurality of image frames. The respective indicator is acquired by the authoring circuitry 230 in order to identify image frames within the plurality of image frames that are indicated as being of interest (importance) by the trained machine learning models. In this way, outputs from a plurality of machine learning models 220 each trained for a given audio property or a given image property are used by the authoring circuitry 230 to perform a selection from the plurality of image frames. On the basis of the respective indicator data output by the plurality of respective machine learning models 220, the authoring circuitry 230 can generate the recording for the content to include groups of images frames that represent "highlight portions" for the content, in which one or more highlight portions in the plurality of image frames are identified on the basis of at least one image based property and one audio based property.

The plurality of machine learning models 220 comprises one or more first machine learning models 221 and one or more second machine learning models 222, and each of the first and second machine learning models comprises at least one of a regression model and a binary classification model. In some examples, each of the plurality of machine learning models 220 is configured to output indicator data indicative of a scalar value for the interest score. Alternatively, each of the plurality of machine learning models 220 is configured to output indicator data indicative of a binary classification (e.g. 0 or 1, where 0 corresponds to a classification of "not interesting"/"not important" and 1 corresponds to a classification of "interesting"/"important", or vice versa) for the interest score. It will be appreciated that some of the plurality of models may be configured to output respective indicator data indicative of a scalar value (for example, a scalar value ranging from 0 to 1 that is indicative of a level of interest) and some of the plurality of models may be configured to output respective indicator data indicative of a binary classification for the interest score. The authoring circuitry 230 is configured to obtain the respective indicator data from at least one first machine learning model 221 and one second machine learning model 222 and to perform the selection on the basis of the respective indicator data output by the respective machine learning models.

The authoring circuitry 230 receives respective indicator data from at least one first machine learning model 221 and associates an interest score with at least some of the image frames in the plurality of image frames on the basis of the respective indicator data. The authoring circuitry 230 further receives respective indicator data from at least one second machine learning model 222 and associates an interest score with at least some of the image frames in the plurality of image frames on the basis of the respective indicator data. In this way, an audio property based interest score can be associated with a given image frame and an image property based interest score may also be associated with the same given image frame. The respective interest scores for the same given image frame can be combined by the authoring circuitry 230 to generate a single interest score (combined interest score or combined importance score) for that image frame. Therefore, a combined interest score can be calculated by the authoring circuitry 230 for each of the plurality of image frames, and then on the basis of the combined interest score, one or more groups of images frames corresponding to interesting sections of the content can be selected for the recording.

It will be appreciated that typically the authoring circuitry uses respective indicator data from at least one first machine learning model and at least one second machine learning model as described above. However, alternatively or in addition it may use indicator data from only at least one first machine learning model or at least one second machine learning model, optionally in dependence upon the indicator data using at least a predetermined threshold value. Hence for example if, in a game, a screen goes black (which may have a low image interest) and then a single menacing voice says something, this may have a high audio interest. Conversely, if in a videogame a nuclear device is triggered, which causes a flash several seconds before the blast is heard, then there may be a high image interest in the absence of an audio interest. Hence even when the authoring circuitry uses respective indicator data from at least one first machine learning model and at least one second machine learning model as described above, optionally it may override a low interest from first (image) model(s) if there is sufficient interest (above a predetermined threshold) from the second (audio) model(s), or vice-versa. In the case of a binary output system, this could equate to using an 'OR' operation.

Referring now to the example in FIG. 4, respective indicator data is output by each of the models 220. In this example, a first machine learning model 221a outputs respective indicator data 251 and a second machine learning model 222a outputs respective indicator data 252. It will be appreciated that respective indicator data from a larger number of machine learning models may be used by the authoring circuitry 230 in a similar manner to that discussed below to select groups of image frames for generating the recording. On the basis of the indicator data 251, the authoring circuitry 230 is configured to assign an interest score to each of the image frames A, B, C . . . N, in which frame A is an image frame that is earlier in the sequence of image frames than the frame N. In this example, the first machine learning model is configured to output a binary classification (0 or 1) for the indicator data. It will be appreciated that the first machine learning model may be configured to output a scalar value for the indicator data and that a scalar value can be used in a similar manner. Similarly, on the basis of the indicator data 252, the authoring circuitry 230 is configured to assign an interest score to each of the image frames A, B, C . . . N.

In the example shown in FIG. 4, the indicator data 251 output by the first machine learning model 221 is such that the authoring circuitry 230 assigns an interest score of 1 to the image frames C, D and E and the indicator data 252 output by the second machine learning model 222 is such that the authoring circuitry 230 also assigns an interest score of 1 to the image frames C, D and E. Therefore, in this case an interesting portion of the plurality of image frames is identified as starting at frame C and ending at frame E. It will be appreciated that FIG. 4 provides a simplified schematic illustration and that the number of images frames is significantly larger than that shown in the illustration. For example, for a frame rate of 100 Hz, the frames C and D may be separated by, for example 100 or possibly 1000 image frames, with each image frame between frames C and D also being labelled with an interest score of 1 for the first model 221 and an interest score of 1 the second model 222, and as such the portion of the content represented from C to E in FIG. 4 may represent anywhere between a few seconds to a few minutes of content and this portion of the content is indicated as being of higher interest relative to the other portions of content corresponding to A to B and F to N. Therefore, the authoring circuitry 230 is configured to select the group of image frames starting at image frame C and ending at image frame E from the plurality of image frames in dependence upon the respective indicator data 251 and 252, and the selected group of image frames is to be included in the recording for the content or at least considered for inclusion in the recording if other groups of image frames are identified.

The authoring circuitry 230 is configured to calculate an overall interest score (combined interest score) for an image frame based on the respective indicator data associated with an image frame. The overall interest score (combined interest score) is calculated for an image frame using the respective indicator data output by the respective machine learning models 220. For an image frame in the plurality of image frames for which the authoring circuitry 230 associates the respective indicator data 251 and the respective indicator data 252 (as shown in FIG. 4), the value for the interest score associated with the indicator data 251 and the value for the interest score associated with the indicator data 252 can be summed to calculate a combined interest score for the image frame (e.g. for frame C in FIG. 4 an overall interest score of 1+1=2 may be calculated). Any calculation may be used to calculate a value for the overall interest score (combined interest score) for a given image frame in a manner such that the value of the overall interest score for the given image frame is dependent upon the respective indicator data associated with the given image frame. For example, rather than summing the values of the respective interest scores associated with an image frame, the values of the respective interest scores may each be multiplied by a scaling factor and then summed to calculate the overall interest score.

In some cases, rather than selecting image frame C as the starting frame and image frame E as the ending image frame in the above example, the authoring circuitry 230 can be configured to select an image frame as a starting image frame that is a predetermined number of image frames before the image frame C as the starting image frame. Therefore, instead of selecting the frame C having an audio and/or image property, which is identified as being of interest as the starting image frame, an earlier image frame can instead be selected as the starting image frame so as to include the portion of content including the progression towards the beginning of a highlight moment or highlight event in the content. This can allow the selected group of image frames to include a predetermined number of image frames preceding the start of the highlight section.

In the example shown in FIG. 4, the authoring circuitry 230 is configured to associate the respective indicator data with the plurality of image frames and to associate a combined interest score with each of the image frames. However, in some examples, the authoring circuitry 230 is configured to determine whether the indicator data satisfies a predetermined threshold condition and to associate the indicator data satisfying the predetermined threshold condition with one or more image frames from the plurality of image frames. For the case where the indicator data output by one of the plurality of machine learning models 220 is indicative of an interest score having a scalar value, a predetermined threshold value may be used by the authoring circuitry 230 to determine whether to associate the indicator data with one or more of the plurality of image frames. In this way, indicator data corresponding to a value for the interest score that is less than the predetermined threshold value may be filtered out by the authoring circuitry 230 and can thus be disregarded when calculating an overall interest score for an image frame. Therefore, indicator data corresponding to a value for the interest score that is greater than or equal to the predetermined threshold can be associated with it's corresponding image frame and used for calculating an overall interest score for that image frame. Applying this threshold condition to the example in FIG. 4, the authoring circuitry 210 can be configured to associate the indicator data 251 and 252 only with the image frames C, D and E so that the other image frames have no associated indicator data. In this way, the processing workload involved in selecting one or more groups of image frames can be reduced to filter out indicator data for which the interest score has a value representing a low level of interest or importance. Similarly, for the case where the indicator data output by one of the plurality of machine learning models 220 is indicative of an interest score having a binary classification (e.g. 0 or 1), a predetermined condition may be used by the authoring circuitry 230 to determine whether to associate the indicator data with one or more of the plurality of image frames. In this way, indicator data corresponding to a first classification (e.g. 1 or "interesting") satisfies the predetermined condition and is thus associated with one or more of the image frames by the authoring circuitry 230. However, indicator data corresponding to a second classification (e.g. 0 or "not interesting") does not satisfy the predetermined condition such that the indicator data may be filtered out by the authoring circuitry 230 and can thus be disregarded when calculating an overall interest score for an image frame.

Hence the interest score may be collective (e.g. a sum of scores) over the first and second models, or a sub-set thereof, and frames are selected if the interest score meets a predetermined threshold. However, alternatively or in addition, as noted above, if any one model generates an interest score above a predetermined threshold (e.g. in a non-binary version), then optionally the associated frame this may also be selected for this reason.

In embodiments of the disclosure, the recording circuitry 240 is configured to generate the recording for the content, the recording comprising one or more of the selected groups of image frames. The recording circuitry 240 generates the recording to include the selected portions of the content that have been identified by the respective machine learning models 220 and selected by the authoring circuitry 230 on the basis of the respective indicator data. Referring now to the example in FIG. 5, a first group of image frames X is selected by the authoring circuitry 230 from the plurality of image frames for the content 400, and a second group of image frames Y is selected by the authoring circuitry 230 from the plurality of image frames for the content 400, each group of image frames representing a portion of the content 400. As explained above, it will be appreciated that FIG. 5 is a schematic illustration in which each of the blocks is used to represent an image frame and that multiple images frames (not shown in the Figure) are provided between the adjacent blocks. The authoring circuitry 230 is configured to output the one or more selected groups of image frames to the recording circuitry 240. The recording circuitry 240 generates the recording 410 for the content 400 so that the recording begins with the first image frame of the group of image frames X and ends with the last image frame of the group of image frames Y, and the last image frame of the group X is before and consecutive with the first image frame of the group Y in the recording 410. In this way, the recording 410 is generated for the content 400 to include portions of the content 400 identified on the basis of the respective indicator data and the total duration of the recording 410 is less than the total duration of the content 400 because the recording 410 comprises fewer images frames than the content 400. The recording 410 therefore represents a highlight recording for the content 400. In addition to selecting the groups of images frames, the authoring circuitry 230 is configured to select the audio data corresponding to the one or more selected groups of image frames so that corresponding audio data is provided to the recording circuitry 240 for inclusion in the recording 410. Once the recording 410 is generated by the recording circuitry 240, the recording 410 can be stored in a data storage unit (not shown in FIG. 1) or communicated via a wired or wireless communication to another data processing apparatus.

The one or more selected groups of image frames and the corresponding audio data may be stored by the recording circuitry 240 in a data storage unit (not shown in FIG. 1) and then later accessed by the recording circuitry 240 to generate the recording using any of the one or more selected groups, or the recording circuitry 240 may be configured to generate the recording 410 for the content 400 during execution of a video game so that the recording is progressively populated with selected groups of image frames during the execution of the video game.

The authoring circuitry 230 is configured to select one or more groups of image frames from the plurality of image frames and to provide the selected one or more groups of image frames to the recording circuitry 240. The recording circuitry 240 can be configured to generate the recording for the content to include at least some of the groups of image frames received from the authoring circuitry 230. The recording circuitry 240 may generate the recording to include each group of image frames that is selected by the authoring circuitry 230 or the recording circuitry 240 may generate the recording to include some of the groups of image frames selected by the authoring circuitry 230. In this way, the authoring circuitry 230 can be configured to select portions of the content indicated as being of interest according to the respective indicator data and to provide the selected portions to the recording circuitry 240 for the recording circuitry 240 to then decide whether to include all or some of the selected portions in the recording, such that the recording circuitry 240 may be provided with a plurality of groups from which to choose from to generate the recording.

For example, the recording circuitry 240 may be configured to generate the recording having either a total duration that is shorter than a predetermined period of time or a total number of image frames that is less than or equal to a predetermined number of image frames. In this case, when the one or more groups of image frames selected by the authoring circuitry 230 have a total duration (or a total number of image frames) exceeding the predetermined period of time (or the predetermined number of image frames), which would result in the recording having a duration (or a total number of image frames) exceeding the predetermined period of time (or the predetermined number of image frames), the recording circuitry 240 is configured to generate the recording to include some of the groups of image frames selected by the authoring circuitry 230. In a simplest case the recording circuitry 240 may randomly select groups of images frames from the one or more groups of image frames selected by the authoring circuitry 230 to generate the recording to have a duration that is shorter than the predetermined period of time or a total number of image frames that is less than or equal to the predetermined number of image frames.

Instead of performing the random selection, the recording circuitry 240 may instead select groups of images frames from the one or more groups of image frames selected by the authoring circuitry 230 on the basis of the interest scores associated with the respective groups so as to select the groups according to an order of priority that is dependent upon the interest score. In this way, the recording circuitry may receive N groups of image frames from the authoring circuitry 230 and select M groups of image frames for generating the recording (M≤N, where M and N are both integers) in dependence upon a group interest score associated with each group. As discussed previously, an overall interest score (overall importance score) is calculated for an image frame in the plurality of image frames on the basis of the respective indicator data. For a group of image frames selected by the authoring circuitry 230, a group interest score is calculated by the authoring circuitry 230 based on the overall interest score calculated for the individual image frames in the group. The group interest score for a group may be calculated by summing the respective overall interest scores for the respective image frames in the group or by averaging (mean, mode, or median) the respective overall interest scores for the respective image frames in the group. In this way, a group interest score can be calculated for the groups selected by the authoring circuitry 230 and a group having a group interest score indicative of a high level of interest can be preferentially included in the recording instead of a group having a group interest score indicative of a low level of interest. In this way, the groups selected by the authoring circuitry 230 can be ranked according to their group interest score, and when only some of the groups selected by the authoring circuitry 230 are to be included in the recording the group interest score can be used to determine a priority ordering.

In embodiments of the disclosure, the authoring circuitry 230 is configured to select the one or more groups of image frames from the plurality of images frames according to an order of priority that is dependent upon the interest score. Rather than the authoring circuitry 230 selecting groups of image frames and the recording circuitry 240 then deciding which of those groups to use for generating the recording (as discussed above), the authoring circuitry 230 may instead be configured to select the one or more groups of image frames according to the order of priority dependent upon the interest score, so that the authoring circuitry 230 only provides groups to the recording circuitry 240 that are to be included in the recording. In this case, all groups that are received by the recording circuitry 240 are used to generate the recording and the authoring circuitry 230 makes the decision as to whether a group is to be included in the recording. The authoring circuitry 230 can thus analyse the overall interest scores associated with the image frames in the plurality of image frames and then select groups of image frames from the plurality of image frames. The authoring circuitry 240 is configured to calculate overall interest scores (combined interest scores) for respective image frames in the plurality of image frames and to identify groups of image frames within the plurality of image frames on the basis of the overall interest scores by identifying clusters of successive image frames for which the overall interest score satisfies a selection condition. This will be discussed in more detail later. Once the groups of image frames have been identified within the plurality of image frames, the authoring circuitry 230 selects one or more of the groups of image frames in dependence upon the group interest score associated with each of the groups. In this way, groups can be identified and then selected according to an order of priority that is dependent upon the interest score to generate a recording for the content, the recording having a total number of image frames that is less than or equal to a predetermined number of image frames. Similarly, the authoring circuitry 230 may select one or more groups of image frames according to an order of priority that is dependent upon the interest score to generate a recording for the content, the recording having a total duration that is shorter than or equal to a predetermined period of time.

In embodiments of the disclosure, the authoring circuitry 230 is configured to assign a start tag to one or more of the image frames and an end tag to one or more image of the frames in the plurality of image frames in dependence upon the respective indicator data associated with the plurality of image frames, the start tag representing an image frame at a start of a group of image frames and the end tag representing an image frame at an end of a group of image frames. FIG. 6a is a schematic illustration showing indicator data 251 output by a first machine learning model 221 and indicator data 252 output by a second machine learning model 222, where the indicator data 251 and 252 is indicative of an interest score having a value of 0 or 1 (binary classification). In this example, a predetermined condition is implemented by the authoring circuitry 230 so that indicator data corresponding to a first classification (an "interesting" classification which is denoted by 1 in FIG. 6a) is associated with an image frame and indicator data corresponding to a second classification (a "not interesting" classification denoted by 0 in FIG. 4) is not associated with an image frame. However, it will be appreciated that implementing the predetermined condition in this way is optional. The authoring circuitry 230 is configured to assign a start tag 610a to an image frame and an end tag 620a to another image frame on the basis of the indicator data 251 and 252. The authoring circuitry 230 calculates a combined interest score for each of the image frames in the content. The value of the calculated combined interest score is plotted as a graph in FIG. 6a for illustrative purposes. It will be appreciated that respective indicator data output by a plurality of respective machine learning models can be used to calculate the combined interest score in this manner. The authoring circuitry 230 is configured to calculate the combined interest score and to detect a block of successive image frames for which the combined interest score remains greater than a predetermined threshold value. In other words, the authoring circuitry 230 may require that the combined interest score has a value that remains greater than a certain value for a predetermined number of image frames. Therefore, spikes which may occur in the value of the combined interest score for individual image frames will not be falsely attributed as being a block of interesting image frames. Upon detecting a block of image frames for which the combined interest score remains greater than a predetermined threshold value, the authoring circuitry 230 then selects one image frame as the start image frame and one image frame as the end image frame for the block and assigns a start tag to the start frame and an end tag to the end frame in dependence upon the respective indicator data. The start tag and the end tag define the boundaries of the group of image frames.

For example, for the case where a group of image frames is identified based on detection of a block of successive image frames for which the combined interest score remains greater than a predetermined threshold value, the authoring circuitry 230 may be configured to assign a start tag to an image frame at the beginning of the group such that the start tag is assigned to the first image frame in the group which has a combined interest score that is greater than or equal to the predetermined threshold value. Similarly, the authoring circuitry 230 may be configured to assign an end tag to an image frame at the end of the group such that the end tag is assigned to the last image frame in the group which has a combined interest score that is greater than or equal to the predetermined threshold value. In this way, a group of image frames is firstly identified and then the first and last image frames in the group that have a combined interest score that satisfy the predetermined threshold value are assigned a start tag and an end tag, respectively. Therefore, for the example shown in FIG. 6a, the start tag 610a may be assigned to the image frame that is the first image frame in the group to have a combined interest score exceeding a predetermined threshold and the end tag 620a may be assigned to the image frame that is the last image frame in the group to have a combined interest score exceeding a predetermined threshold (for example, the value of the predetermined threshold may be set to 1 in the example shown and the start and end tags are assigned accordingly to define the start and end of the group).

In a similar manner to FIG. 6a, FIG. 6b is another schematic illustration showing a graph representing the calculated value of the combined interest score based on respective indicator data output by one or more first machine learning models 221 and one or more second machine learning models 222, where the respective indicator data output by each model is indicative of an interest score having a scalar value, such as a value ranging from 0 to 1. In this example, the combined interest score may be calculated on the basis of respective indicator data output by any number of respective first and second machine learning models. Whereas FIG. 6a shows two respective groups of image frames selected by the authoring circuitry by assigning the start and end tags, FIG. 6b illustrates a single group of image frames in which a start tag 610a is assigned to one image frame and an end tag 620a is assigned to another image frame. In this example the predetermined threshold (illustrated by the horizontal dashed line) may be set such that the image frame to which the start tag 610a is assigned has a combined interest score exceeding the predetermined threshold value and the immediately preceding image frame (i.e. the frame to the left) has a combined interest score that is less than the predetermined threshold value. In this way, outputs from at least two respective machine learning models (at least one first machine learning model and one second machine learning model) for a content can be combined to calculate levels of interest associated with portions of the content and a statistical analysis of the outputs allows a start tag and an end tag to be assigned to a specific image frame for defining the boundary of a highlight portion of the content.

As discussed previously, in embodiments of the disclosure each of the first and second machine learning models comprises a regression model or a binary classification model. As such, each machine learning model is configured to output respective indicator data, where the respective indicator data is indicative of either a binary classification (corresponding to a binary value) or a scalar value for the interest score for an image frame. The plurality of machine learning models may comprise respective machine learning models in which some of the models have a regression model and some of the models have a binary classification model or all of the models may include a regression model or all of the models may include a binary classification model, and the outputs can be used in a combined analysis to select one or more groups of image frames from a plurality of image frames.

Training the Machine Learning Models

In embodiments of the disclosure, each first machine learning model 221 is trained with image data to learn a relationship between a property of the image data and the interest score (also referred to as an importance score). A first machine learning model 221 therefore receives image data as an input and outputs indicator data indicative of a binary or scalar value for the interest score to indicate a degree of interest based on an image property for which the first machine learning model has been trained. In some examples, the training data may comprise one or more previously generated highlight videos for a content. The highlight videos represent a ground truth for interesting content. This data may, for example, be obtained from a video sharing platform. A first machine learning model 221 can be trained using the highlight video data to learn which characteristics for a given image property correlate with highlight scenes and the first machine learning model 221 is trained to learn a relationship between a characteristic for the property and a scalar or binary value for an interest score. For example, a first machine learning model 221 can be trained to learn a relationship between variations in a value associated with the property and a scalar or binary value for an interest score. In some examples, the training data may comprise image data for a content and each first machine learning model can be trained for a given image property according to semi-supervised learning by clustering the image frames for which the given property has a similar characteristic (setting). This may involve using k-means clustering to sort the image frames into separate clusters, where each cluster is associated with a characteristic for the property that is present in the content. Then, each cluster can be manually labelled with a label indicating a binary or scalar value for a level of interest. As will be appreciated, labelling frames in this way is considerably quicker than having to go through thousands, or even hundreds of thousands of frames and manually labelling each frame with a corresponding label. Alternatively, the training data may comprise a plurality of image frames in which at least some of the frames are labelled (manually tagged) to indicate a level of interest for the image frame on the basis of a binary classification or a scalar value. In the case where only interesting frames are labelled, the labelled frames represent a ground truth for interesting content and the non-labelled frames represent a ground truth for non-interesting content. The first machine learning model 221 can be trained to infer a function from labelled training data for mapping an input to an output so as to output indicator data according to the function that is learned for a given image property. Hence more generally, each of the first machine learning models can be trained for a given image property to correlate a characteristic for the given image property with an interest score that may be a binary classification of a scalar value. For the case where the training data corresponds to data for a same content (e.g. a particular video game) each of the first machine learning models may be trained for a particular content. However, the training data may correspond to data for different content (e.g. a plurality of different video games) and each first machine learning model may be trained for its given image property regardless of whether the content is the same.

In embodiments of the disclosure, each first machine learning model 221 is trained to learn the relationship for a different property of the image data. The plurality of machine learning models 220 comprises one or more first machine learning models 221 and one of the first machine learning models 221 is trained for a first property of the image data and another of the first machine learning models 221 is trained for a second property of the image data. In this way, respective first machine learning models 221 trained for respective properties of the content can provide respective output data for the same content and a combination of the respective outputs is used for selecting groups of image frames for generating a recording.

In embodiments of the disclosure, each first machine learning model 221 is trained to detect the property for the image data and to output the indicator data in dependence upon the property. The image data obtained by the input circuitry 210 can be provided as an input to each first machine learning model 221, and each first machine learning model 221 is configured to extract from the image data the property for which the first machine learning model 221 has been trained and to output indicator data on the basis of the extracted property. In some examples, each first machine learning model 221 comprises an algorithm for detecting the given image property in the image data.

In embodiments of the disclosure, the one or more first machine learning models 221 comprise one or more from the list consisting of: a machine learning model trained to output the respective indicator data in dependence upon a luminance associated with an image frame; a machine learning model trained to output the respective indicator data in dependence upon a degree of motion for an image frame with respect to a next image frame; and a machine learning model trained to output the respective indicator data in dependence upon a status of a visual metric associated with an image frame, the visual metric indicative of a status of a character in the content or a progression of the content. Therefore, the image properties for which the first machine learning models 221 are trained include: image luminance (image brightness); image motion; and changes in a key region of an image frame. Meanwhile as noted previously herein, the model may optionally be based on the whole image or part of the image.

The image data for each image frame comprises pixel values. For an RGB (red, green, blue colour components) image frame, each pixel has an appearance that is defined by the R, G and B values. These values indicate the intensity of the red, green and blue components of the pixel respectively. For example, each value may be represented by an 8-bit number thus having 256 possible values for representing the colour component. A first machine learning model 221 trained for the image luminance property is configured to calculate an image luminance for an individual image frame by extracting image brightness information from the image data on the basis of the RGB values. The luminance for the image frame may be calculated using a RGB to luminance conversion formula of the form: luminance $Y=X*R+Y*G+Z*B$, where X, Y and Z are known conversion parameters. Similarly, for a YUV (Y is the luma component, U and V are the chrominance components) image frame a value associated with the Y component is indicative of the luminance for the pixel. The first machine learning model 221 trained for the image luminance property can calculate a luminance for the image frame by averaging (mean, median or mode) the luminance values for each of the pixels in the image frame to calculate an average luminance for the image frame or by summing the luminance values to calculate a total luminance value. The first machine learning model 221 trained for the image luminance property can therefore calculate an image luminance for an image frame and is trained to output indicator data for an image frame on the basis of the average or total luminance for the image frame. For example, an explosion or a firing of a rocket depicted in an image frame will result in a higher average or total luminance for the image frame. The presence of such high luminance values are correlated with higher interest scores. As such, for an image frame in the content for which such an event is present, the first machine learning model 221 trained for the image luminance property is configured to output indicator data to indicate that the image frame is considered to be of high interest either in the form of a binary output or a scalar output.

The image data comprises a plurality of such image frames arranged in a sequence so as to display a sequence of 2D image frames for creating the illusion of motion. One of the first machine learning models 221 can be trained to output the respective indicator data in dependence upon an amount of motion for an image frame in the sequence of image frames. Using known motion estimation techniques to detect motion vectors associated with an image frame, the first machine learning model 221 is configured to detect an amount of motion for an image frame. The motion vectors describe a transformation (frame-to-frame image displacement) from the image frame relative to another image frame in the sequence (typically the next image frame in the sequence or an immediately previous image frame in the sequence). The first machine learning model 221 can therefore receive image data as an input and output respective indicator data for one or more of the image frames on the basis of a displacement of the image frame relative to a reference image frame. For example, for a scene in which multiple avatars are moving around there will be a larger amount of displacement from one image frame to the next and as such a relatively large amount of motion is detected for the image frames corresponding to the scene compared to a scene in which only a single avatar is present. A higher amount of overall displacement associated with an image frame can be correlated with higher interest scores, and a higher amount of overall frame motion can be correlated with a level of activity associated with the image frame.

For some types of content, such as a video game, a region of an image frame may be used to continually display an indicator or metric associated with the content. Many video games often include a visual metric for indicating a status of a game such as a visual metric indicative of a progression of the video game, or a visual metric indicative of a status of a character in the game. For example, the visual metric may be in the form of a bar having a configuration that changes during the video game according to a state of an avatar (e.g. either the user's avatar or an opponent avatar corresponding to a game bot or another user), such as a health of the avatar or a number of points/rewards attained by the character, or according to a game score associated with either the avatar or the progression of the game. For example, for a video game in which the aim is to score points, such as a football or basketball video game, a visual metric may be provided for indicting a current status of the game in the form of at least one number and as the video game progresses the status of the visual metric is updated. One of the first machine learning models 221 can therefore receive image data as an input and is configured to detect a key region in an image frame corresponding to a location of a visual metric for the content. Changes in the visual metric can be detected by the first machine learning model 221 and indicator data output by the first machine learning model is indicative of an amount of change associated with the visual metric from one image frame to another. Therefore, large changes in the configuration of the visual metric can be correlated with indicator data indicative of a larger value for the interest score whereas small changes in the configuration can be correlated with a smaller value for the interest score, in which a larger value for the interest score is indicative of a higher level of interest and a smaller value is indicative of a lower level of interest. Similarly, the first machine learning model 221 may be trained to correlate a rate of change of the configuration of the visual metric with a value for the interest score so that indicator data corresponding to a scalar value for the interest score is output in accordance with a rate of change of the configuration of the visual metric.

In some examples, the first machine learning model 221 trained for the visual metric property in the image frame may comprise a binary classification model so that in response to a change in the visual metric, indicator data corresponding to a first classification (e.g. 1 or "interesting" classification) is output by the first machine learning model. In addition, to avoid the respective indicator data output by the first machine learning model 221 from being interpreted by the authoring circuitry as a spike in the combined interest score for a single image frame, the machine learning model 221 may be configured to output the respective indicator having the first classification for the image frame associated with the change in the visual metric and also for each of a predetermined number of image frames preceding the image frame associated with the change. Therefore, in the example where the content is a football video game, the image frames preceding and building up to the scoring of a goal can be associated with indicator data output by the first machine learning model 221 so that this portion of content may be selected by the authoring circuitry 230 on the basis of the respective indicator data output by the plurality of machine learning models 220.

In embodiments of the disclosure, each second machine learning model 222 is trained with audio data to learn a relationship between a property of the audio data and the interest score (also referred to as an importance score). The one or more second machine learning models 222 can be trained in a similar manner to that described above in relation to the first machine learning models 221 on the basis of audio data rather than image data. Audio data associated with one or more previously generated highlight videos may be used as training data for training the second machine learning models 222 in a manner similar to that described above. Similarly, the training data may comprise a plurality of image frames in which at least some of the image frames are labelled (manually tagged) to indicate a level of interest for the image frame on the basis of a binary classification or a scalar value, and the audio data corresponding to the image frames can be used for training the second machine learning models 222. In this way, the labels associated with the image frames can be associated with the corresponding audio data and the labelled audio data can be used for training in a similar manner to that described above for the first machine learning models 221.

In embodiments of the disclosure, each second machine learning model is trained to learn the relationship for a different property of the audio data. The plurality of machine learning models 220 comprises one or more second machine learning models 222 and one of the second machine learning models 222 is trained for a first property of the audio data and another of the first machine learning models 221 is trained for a second property of the audio data, the first property different from the second property. In this way, respective second machine learning models 222 trained for respective properties of the content can provide respective output indicator data for the same content and a combination of the respective outputs is used for selecting groups of image frames for generating a recording.

In embodiments of the disclosure, each second machine learning model 222 is trained to detect the property for the audio data and to output the respective indicator data in dependence upon the property. The audio data obtained by the input circuitry 210 can be provided as an input to each second machine learning model 222, and each second machine learning model 222 is configured to extract from the audio data the property for which the second machine learning model 222 has been trained and to output indicator data on the basis of the extracted property. In some examples, each second machine learning model 222 comprises an algorithm for detecting the given audio property in the audio data. Again as noted previously, different models may be trained on only parts of the overall audio data.

In embodiments of the disclosure, the one or more second machine learning models 222 comprises a machine learning model trained to output the respective indicator data in dependence upon a type of sound. The audio data corresponding to the image data comprises data indicative of audio signals that vary with respect to time to represent sounds. Such audio signals typically have a frequency in the range of 20 to 20 kHz corresponding to the lower and upper limits of human hearing. The audio data may include many different sound types associated with various aspects of the content. For example, game developers typically use a library of sounds including object sounds, music sounds and character sounds when developing a video game, such that certain types of sounds are associated with a given object or a given character. The second machine learning model 222 may comprise an algorithm for detecting types of sound in the audio data. At least one of the second machine learning models 222 can be trained to detect a sound present in the audio data and to classify the sound according to one or more types of sounds for which the second machine learning model 222 is trained. The second machine learning model 222 is trained using audio data to learn properties of the audio data that are characteristic of certain types of sounds, and for an input audio signal the trained second machine learning model 222 can classify the input audio signal according to the one or more types of sound for which the second machine learning model 222 has been trained. The second machine learning model 222 therefore receives audio data as an input and outputs respective indicator data indicative of the interest score according to the classification of the sound in the audio data.

In some examples, the second machine learning model 222 is configured to output indicator data having a binary classification according to whether the input audio data comprises a sound corresponding to the one or more types of sounds for which the model 222 is trained. In this case, when the model 222 assigns a classification from the one or more classifications for which the model 222 has been trained to the input audio data, the model 222 outputs indicator data having a first classification (e.g. 1 or "interesting"/"important") otherwise the model 222 outputs indicator data having a second classification (e.g. 0 or "not interesting"/"unimportant") or does not provide any output. In some examples, the second machine learning model 222 is trained to learn a relationship between a type of sound and a scalar value for the interest score. Therefore, the machine learning model 222 can be trained to output indicator data having an interest score that differs depending on the type sound. For example, the second machine learning model 222 may output indicator data corresponding to a first value for the interest score for a first type of sound and may output indicator data corresponding to a second value for the interest score for a second type of sound. As such, when the audio data provided as an input to second machine learning model 222 comprises a first type of sound, indicator data representing a first value for the interest score can be output. Alternatively or in addition, the second machine learning model 222 is trained to learn a relationship between a loudness associated with a type of sound and a scalar value for the interest score. Therefore, the second machine learning model 222 can be trained to learn relationship between a loudness for the type of sound and a scalar value for the interest score, so that the indicator data distinguishes between two respective sounds having the same type but different volumes. For example, a voice of a character in a content may correspond to one type of sound for which the model 222 is trained and indicator data corresponding to a low level of interest is output when the character is speaking softly, whereas indicator data corresponding to a high level of interest is output when the character is shouting.

In embodiments of the disclosure, the type of sound comprises one or more from the list consisting of: a voice of a respective character; a sound of a gun shot; and a sound of an explosion. One second machine learning model 222 can be trained to output respective indicator data for at least one these types of sound or a respective second machine learning model 222 can be trained for each of the respective types of sound. As discussed above, in a simplest case the second machine learning model 222 outputs indicator data having a binary classification, where a first classification indicates that one of the types of sound is detected and a second classification (or not output) indicates an absence of the type of sound in the audio data. However, in some cases the second machine learning model 222 is trained to output indicator data for which the interest score varies in dependence upon the type of sound so that a different value for the interest score is generated for a different type of sounds. In some cases, the second machine learning model 222 is trained output indicator data for which the interest score varies in dependence upon the loudness of the type of sound so that a different value for the interest score is generated for different levels of loudness for the same type of sound. For example, using the training techniques discussed above, a second machine learning model 222 can be trained for a sound of an explosion so that indicator data having a binary classification is output to indicate the presence of an explosion sound or indicator data having a scalar value is output to indicate a higher level of interest for a louder explosion sound and a lower level of interest for a quieter explosion sound. Hence more generally, a second machine learning model 222 outputs indicator data on the basis of the relationship between the loudness of the explosion sound in the content (or a character's voice sound in the content or a gun shot sound in the content) and the value of the interest score. Other sounds identifiable by performing audio analysis may be used in a similar manner.

In embodiments of the disclosure, the one or more second machine learning models 222 comprises a machine learning model trained to output the respective indicator data in dependence upon a loudness of music. The audio data may include instrumental or vocal sounds forming a musical composition. Traditional musical compositions are generally represented by an audio signal having a sequence of notes each having a pitch and duration. A second machine learning model 222 can be trained to learn a function that maps a loudness of music to a value for the interest score. As such, an audio signal comprising a musical composition can be provided as an input to the second machine learning model 222 and indicator data is output having a value for the interest score that is dependent upon the loudness of the music (intensity of the audio signal). Game developers often use musical compositions to achieve a range of different effects for creating an immersive experience and variations in volume levels of a musical composition may be used in variety of ways. A second machine learning model 222 can be trained using labelled data, for example, to learn a relationship between a loudness associated with an acoustic signal and a value for the interest score. Whilst louder sounds may generally be attributed to a higher level of interest, the relationship may not be linear across the range of volume levels typically used in a content such as a video game, and above a certain volume level further increases in volume may result in a smaller change in the level of interest.

In embodiments of the disclosure, the one or more second machine learning models 222 comprises a machine learning model trained to output the respective indicator data for one image frames in dependence upon a loudness of music associated with the one image frame relative to a loudness of the music associated with one or more image frames before and consecutive with the one image frame in the content. Respective portions of the audio data can be associated with the respective image frames. For example, the audio data may include a plurality of audio frames output in synchronization with the plurality of image frames. Audio data is input to the second machine learning model 222 and respective indicator data is output for a given image frame according to a loudness of musical sounds corresponding to the given image frame relative to a loudness of musical sounds corresponding to at least the image frame immediately before the given image frame in the sequence of image frames. In some examples, a predetermined number of image frames before and consecutive with the given image frame may be selected for comparison with the given image frame by comparing an average (mean, median or mode) loudness for the audio associated with the predetermined number of image frames with the average loudness of the audio associated with the given image frame. In this case, at least one second machine learning model 222 is trained to learn a relationship between a relative change in loudness of an audio signal and a value for the interest score and to output respective indicator data for the image frames having corresponding music. In this way, respective indicator data can be output to reflect changes in the loudness (intensity) of the music with respect to time. In embodiments of the disclosure, the second machine learning model 222 is trained to detect a pattern in the loudness of the music and to output the respective indicator data to indicate a climax point in the pattern. By comparing the loudness of the music for a given image frame with the loudness of the music for one or more previous image frames, the pattern in the intensity of the music can be reflected in the indicator data output for the image frames corresponding to the music. In particular, game developers may use gradual increases in music loudness (crescendo) to build towards a climax point in a content, the climax point corresponding to an image frame of particular interest or importance. Therefore, the second machine learning model 222 can thus be trained to learn a relationship between relative change in loudness of an audio signal and a value for the interest score and to output indicator data, and for a climax point the model is trained to identify the climax point as being of particularly high importance (high interest) and indicator data is output accordingly for the image frame associated with the climax point.

Whilst the description above refers to loudness, more generally it may apply to intensity, where intensity relates to a degree of one or more selected from the list consisting of loudness (as described above), speed (e.g. note density and/or rate), and rate of occurrence of different musical notes (e.g. musical dynamism).

In embodiments of the disclosure, the plurality of machine learning models 220 comprises a third machine learning model, in which the third machine learning model is trained to classify a user in dependence upon historical data associated with the user, wherein a weighting is applied to the output of each of the first and second machine learning models in dependence upon the classification of the user. The third machine learning model is configured to obtain historical data for a given user, which may include one or more highlight videos previously watched by the user or highlight videos generated based on the user's previous game play (for example, by the user selecting a 'share button' during a video game to manually save a portion of the video game). Alternatively or in addition, the historical data for a given user may include user profile data indicating video games previously played by the user or a selection made by the user of a type of content from a plurality of types of content. For example, the user may select, form a graphical user interface, a first type of content from a list of respective types of content indicating a preferred type of content for the user. The third machine learning model is trained to classify the user according to a plurality of predetermined user classifications using the user's historical data. For example, in the case where the historical data indicates that a user has previously watched or has shared scenes involving explosions, a first classification may be assigned to the user, whereas for the case where the historical data indicates that a user has previously watched or has shared scenes involving defeating an enemy a second classification may be assigned to the user, the first classification different from the second classification. A weighting can therefore be applied to the indicator data output by at least one of the plurality of machine learning models in dependence upon the classification assigned to the user, so that an output from at least one machine learning model is given a greater or lesser weighting relative to an output from the another machine learning model of the plurality of machine learning models 220.

The one or more first machine learning models 221 and the one or more second machine learning models 222 are each trained using image data and audio data, respectively, so that a given first machine learning model 221 outputs indicator data indicative of an interest score for a given image property and a given second machine learning model 222 outputs indicator data indicative of an interest score for a given audio property. Therefore, each of the first and second machine learning models is trained to learn a function for a given image property or audio property such that the models may not be trained for a specific user. In this way, the individual models can each be trained to output respective indicator data, and the recording can be generated for a given user by applying a weighting to the respective indicator data output by one or more of the trained models. In this way, for the same content and using the machine learning models having been trained using the same training data, different recordings may be generated for different users by applying a weighting to the outputs of the machine learning models that is dependent upon a user classification. Therefore, when calculating a combined interest score for an image frame, a weighting may be applied to the respective indicator data from a given machine learning model to adjust the contribution from that given machine learning model to the combined interest score to either increase or decrease the relevance of the indicator data from the given machine learning model for the combined interest score.

Figure 7:
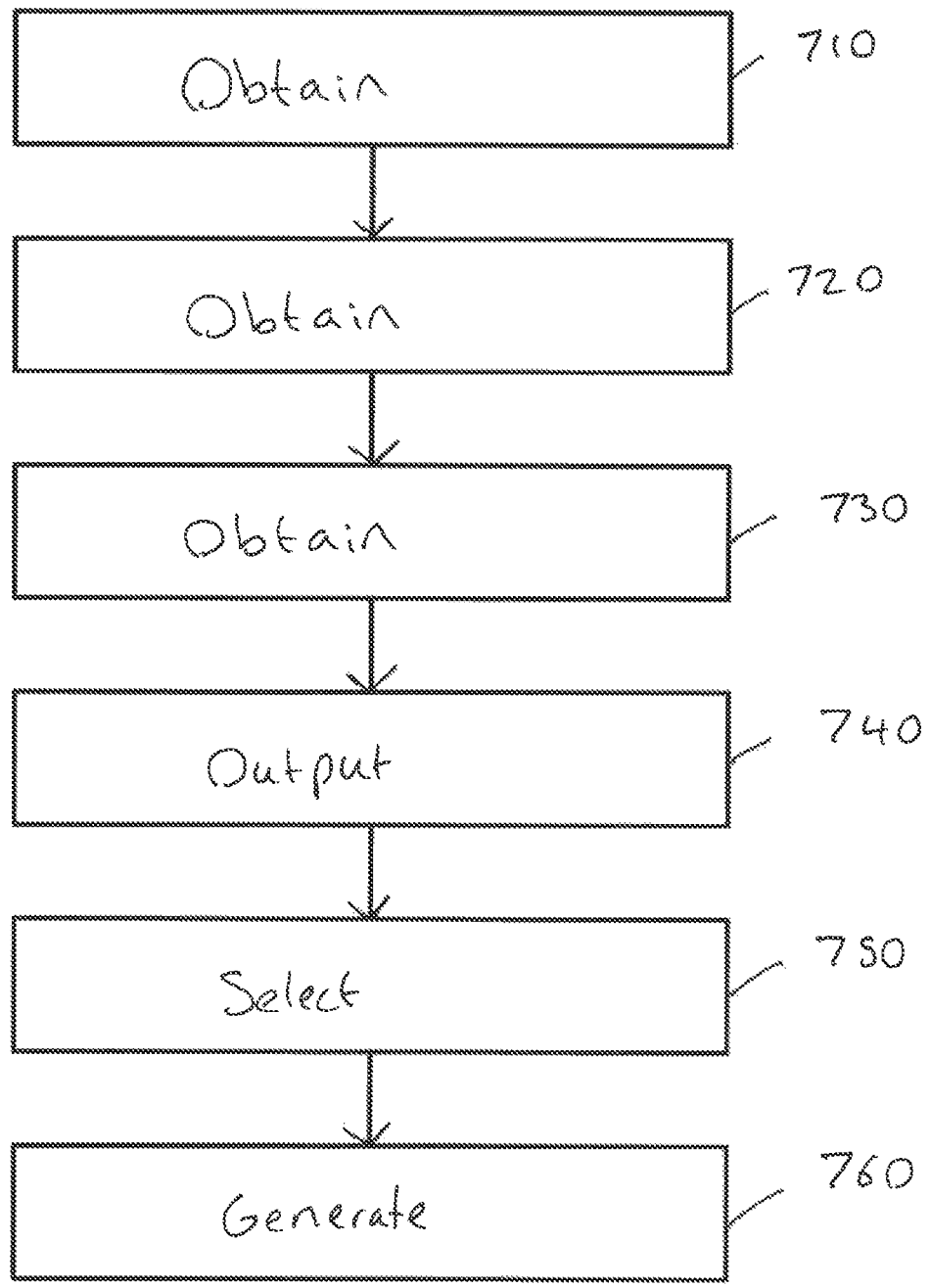
FIG. 7 is a schematic flowchart illustrating a data processing method.

Referring now to FIG. 7, in embodiments of the disclose a method of generating a recording for a content, comprises:
obtaining (at a step 710) image data and corresponding audio data for the content, the image data comprising a plurality of image frames;
obtaining (at a step 720), by one or more first machine learning models, at least a part of the image data;
obtaining (at a step 730), by one or more second machine learning models, at least a part of the audio data;
outputting (at a step 740), by each of the first and second machine learning models, respective indicator data for the plurality of image frames, wherein the respective indicator data associated with an image frame is indicative of an interest score for the image frame;
selecting (at a step 750) one or more groups of image frames from the plurality of image frames in dependence upon the respective indicator data associated with the plurality of image frames (optionally in dependence upon the respective indicator data from at least one first machine learning model and at least one second machine learning model); and
generating (at a step 760) the recording for the content, the recording comprising one or more of the selected groups of image frames.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A data processing apparatus adapted to generate a recording for a content, comprising:
input circuitry configured to obtain image data and corresponding audio data for the content, the image data comprising a plurality of image frames;
a plurality of machine learning models comprising one or more first machine learning models and one or more second machine learning models, each first machine learning model configured to obtain at least a part of the image data and trained to output first respective indicator data for the plurality of image frames, each second machine learning model configured to obtain at least a part of the audio data and trained to output second respective indicator data for the plurality of image frames corresponding to the at least a part of the audio data, wherein a respective indicator data associated with an image frame is indicative of an interest score for the image frame;
authoring circuitry configured to select one or more groups of image frames from the plurality of image frames in dependence upon the first respective indicator data and the second respective indicator data associated with the plurality of image frames; and
recording circuitry configured to generate the recording for the content, the recording comprising one or more of the selected groups of image frames, wherein:
each second machine learning model is trained with audio data to learn a relationship between a property of the audio data and the interest score, the one or more second machine learning models comprises a machine learning model trained to output the second respective indicator data for one image frame in dependence upon an intensity of music associated with the one image frame relative to an intensity of the music associated with one or more image frames before and consecutive with the one image frame in the content, and the machine learning model among the one or more second machine learning models is trained to detect a pattern in the intensity of the music and to output the respective second indicator data to indicate a climax point in the pattern.

2. The data processing apparatus according to claim 1, wherein each first machine learning model is trained with image data to learn a relationship between a property of the image data and the interest score.

3. The data processing apparatus according to claim 2, wherein each first machine learning model is trained to learn the relationship for a different property of the image data.

4. The data processing apparatus according to claim 2, wherein the one or more first machine learning models comprises one or more from the list consisting of:
 a machine learning model trained to output the first respective indicator data in dependence upon a luminance associated with an image frame;
 a machine learning model trained to output the first respective indicator data in dependence a machine learning model trained to output the first respective indicator data in dependence upon a degree of motion for an image frame with respect to a next image frame; and
 a machine learning model trained to output the first respective indicator data in dependence upon a status of a visual metric associated with an image frame, the visual metric indicative of a status of a character in the content or a progression of the content.

5. The data processing apparatus according to claim 1, wherein each second machine learning model is trained to learn the relationship for a different property of the audio data.

6. The data processing apparatus according to claim 1, wherein the one or more second machine learning models comprises a machine learning model trained to output the second respective indicator data in dependence upon a type of sound.

7. The data processing apparatus according to claim 1, wherein the one or more second machine learning models comprises a machine learning model trained to output the second respective indicator data in dependence upon an intensity of music, where intensity relates to a degree of one or more selected from the list consisting of:
 i. loudness;
 ii. speed; and
 iii. rate of occurrence of different musical notes.

8. The data processing apparatus according to claim 1, wherein the authoring circuitry is configured to assign a start tag to one or more of the image frames and an end tag to one or more image of the frames in the plurality of image frames in dependence upon the respective indicator data associated with the plurality of image frames, the start tag representing an image frame at a start of a group of image frames and the end tag representing an image frame at an end of a group of image frames.

9. The data processing apparatus according to claim 1, comprising a third machine learning model trained to classify a user in dependence upon historical data associated with the user, wherein a weighting is applied to the output of each of the first and second machine learning models in dependence upon the classification of the user.

10. The data processing apparatus according to claim 1, wherein the authoring circuitry is configured to select the one or more groups of image frames according to an order of priority that is dependent upon the interest score.

11. The data processing apparatus according to claim 1, wherein each of the first and second machine learning models comprises a regression model or a binary classification model.

12. A method of generating a recording for a content, comprising:
 obtaining image data and corresponding audio data for the content, the image data comprising a plurality of image frames;
 obtaining, by one or more first machine learning models, at least a part of the image data, wherein each first machine learning model is configured to obtain at least a part of the image data and trained to output first respective indicator data for the plurality of image frames;
 obtaining, by one or more second machine learning models, at least a part of the audio data, wherein each second machine learning model is configured to obtain at least a part of the audio data and trained to output second respective indicator data for the plurality of image frames corresponding to the at least a part of the audio data;
 outputting, by each of the first and second machine learning models, respective indicator data for the plurality of image frames, wherein the respective indicator data associated with an image frame is indicative of an interest score for the image frame;
 selecting one or more groups of image frames from the plurality of image frames in dependence upon the first respective indicator data and the second respective indicator data associated with the plurality of image frames; and
 generating the recording for the content, the recording comprising one or more of the selected groups of image frames, wherein:
 each second machine learning model is trained with audio data to learn a relationship between a property of the audio data and the interest score,
 the one or more second machine learning models comprises a machine learning model trained to output the second respective indicator data for one image frame in dependence upon an intensity of music associated with the one image frame relative to an intensity of the music associated with one or more image frames before and consecutive with the one image frame in the content, and
 the machine learning model among the one or more second machine learning models is trained to detect a pattern in the intensity of the music and to output the respective second indicator data to indicate a climax point in the pattern.

13. A non-transitory, computer readable storage medium containing computer software which, when executed by a computer, causes the computer to carry out a method of generating a recording for a content, comprising:
 obtaining image data and corresponding audio data for the content, the image data comprising a plurality of image frames;
 obtaining, by one or more first machine learning models, at least a part of the image data, wherein each first machine learning model is configured to obtain at least a part of the image data and trained to output first respective indicator data for the plurality of image frames;

obtaining, by one or more second machine learning models, at least a part of the audio data, wherein each second machine learning model is configured to obtain at least a part of the audio data and trained to output second respective indicator data for the plurality of image frames corresponding to the at least a part of the audio data;

outputting, by each of the first and second machine learning models, respective indicator data for the plurality of image frames, wherein the respective indicator data associated with an image frame is indicative of an interest score for the image frame;

selecting one or more groups of image frames from the plurality of image frames in dependence upon the first respective indicator data and the second respective indicator data associated with the plurality of image frames; and generating the recording for the content, the recording comprising one or more of the selected groups of image frames, wherein:

each second machine learning model is trained with audio data to learn a relationship between a property of the audio data and the interest score, the one or more second machine learning models comprises a machine learning model trained to output the second respective indicator data for one image frame in dependence upon an intensity of music associated with the one image frame relative to an intensity of the music associated with one or more image frames before and consecutive with the one image frame in the content, and the machine learning model among the one or more second machine learning models is trained to detect a pattern in the intensity of the music and to output the respective second indicator data to indicate a climax point in the pattern.

* * * * *